US005479365A

United States Patent [19]
Ogura

[11] Patent Number: 5,479,365
[45] Date of Patent: Dec. 26, 1995

[54] EXPONENTIATION REMAINDER OPERATION CIRCUIT

[75] Inventor: Naoyuki Ogura, Tokyo, Japan

[73] Assignee: NEC Corporation, Tokyo, Japan

[21] Appl. No.: 163,992

[22] Filed: Dec. 7, 1993

[30] Foreign Application Priority Data

Dec. 9, 1992 [JP] Japan .................... 4-329060

[51] Int. Cl.[6] .................................................. G06F 7/38
[52] U.S. Cl. ........................................ 364/746; 364/749
[58] Field of Search .................................. 364/746, 749, 364/715.01, 787, 722; 380/30, 46

[56] References Cited

U.S. PATENT DOCUMENTS

| 4,870,681 | 9/1989 | Seldack ........................ 380/30 |
| 5,046,094 | 9/1991 | Kawamura et al. ............ 380/46 |
| 5,289,397 | 2/1994 | Clark et al. ................... 364/746 |

*Primary Examiner*—Roy N. Envall, Jr.
*Assistant Examiner*—Emmanuel L. Moise
*Attorney, Agent, or Firm*—Whitham, Curtis, Whitham & McGinn

[57] ABSTRACT

An exponentiation remainder operation circuit includes a first exponentiation remainder operator for performing an exponentiation remainder operation for a n/2 bit length parameter, in which n is an even number, a second exponentiation remainder operator, a first adder/subtractor for performing addition and subtraction for a n/2 bit length parameter, a second adder/subtractor, and a central processing unit (CPU) for performing an exponentiation remainder operation for a n-bit length parameter by controlling the exponentiation remainder operation of the first exponentiation remainder operator for the upper n/2 bits of the n-bit length parameter, the exponentiation remainder operation of the second exponentiation remainder operator for the lower n/2 bits of the n-bit length parameter, and addition and subtraction of the results of operations of the first and second exponentiation remainder operators by the first and second adders/subtractors.

13 Claims, 24 Drawing Sheets

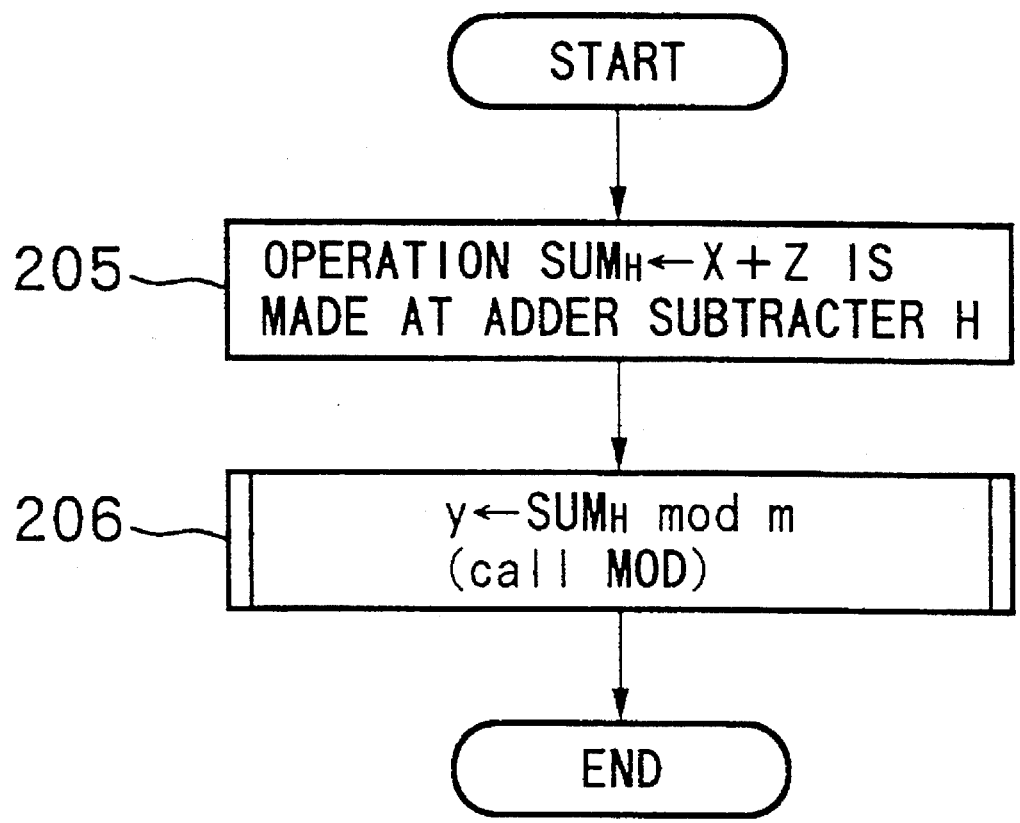

EXPONENTIATION REMAINDER OPERATION CIRCUIT

BACKGROUND OF THE INVENTION

1. Field of the Invention

The present invention relates to an exponentiation remainder operation circuit, and particularly relates to an exponentiation remainder operation circuit to operate multiple-digit adjusting numbers used in public key code systems, for example.

2. Description of the Related Art

Conventionally, this type of exponentiation remainder operation circuit is used for public key cryptosystems, and particularly for RSA codes, as disclosed in "A generalization of Brickell's algorithm for fast modular multiplication" (Bit, vol. 28, 1988). "RSA" means a password developed by R. L. Rivest, A. Shamir and L. Adleman as disclosed in U.S. Pat. No. 4,405,829.

FIG. 7 is a block diagram showing an example of a conventional exponentiation remainder operation circuit. The exponentiation remainder operation to be executed here is "$A = X^E \mod N$", which is to determine the remainder A of the division where the value obtained by exponentiation of parameter X with parameter E is divided by parameter N. It is supposed here that parameter X is set at a register X 608, parameter E at a shift register E 617 and two's compliment of parameter N at a register K 612 in advance. All parameters have n bits.

A selector D 601 outputs 0 or 1 to a register D 602 depending on the value of a signal SELD 623: it outputs a signal M627 when the signal SELD 623 is 0, and the value 0 when the signal SELD 623 is 1. The register D 602 stores the signal input from the selector D 601 according to a signal WRD 624 and outputs the signal value to a one-bit left shifter 603 and a selector A 606.

The one-bit left shifter 603 shifts the signal input from the register D602 to the left by one bit and outputs the shifted signal value to a first adder 603. For the least significant bit of the shifted signal, the value 0 is output.

The selector A 606 outputs, to a register A 607, the data from the register D602 when a signal SELA618 is 0 and the value 1 when the signal SELA618 is 1. The register A607 stores the signal input from the selector A606 according to a signal WRA 619 and outputs the stored value to an (A×s) multiplier 611 and to a selector B 609.

In other words, the register A607 holds the intermediate and final results of the exponentiation remainder operation. The register X 608 has the parameter X.

The selector B 609 works according to the value of a signal SELB 620 and outputs, to a shift register B610, the data from the register A 607 when the signal is 0 and the data from the register X 608 when the signal is 1. The shift register B 610 stores the signal input from the selector B609 according to a signal WRB 621. According to a signal SFTB622, it also shifts the stored value to the left by one bit and outputs the shifted out signal to the (A×s) adder 611.

The (A×s) adder 611 makes multiplication using the signal input from the register A607 and the signal input from the shift register B 610 and outputs the result to the first adder 604. Since the actual input value from the shift register B 610 is limited to 0, 1 or 2, the multiplier device can be of a simple configuration using bit shifting.

The first adder 604 adds the input from the one-bit left shifter 603 to the input from the (A×s) multiplier 611 and outputs the result as a signal m626 to a second adder 605 and a (K×(a÷N)) operator 613. The register K 612 holds two's compliment of parameter N.

The (K×(a÷N)) operator 613 divides the signal m626 input from the first adder by parameter N, multiplies by its quotient the signal input from the register K 612 and outputs the result to the second adder 605 as a signal tK628.

The second adder 605 adds the input from the first adder 604 to the signal tK628 input from the (K× (a÷N)) operator 613 and outputs the result as the signal M627 to the selector D 601. The shift register E 617 having parameter E as initial setting shifts the parameter value to the left by one bit according to the signal SFTE625 and outputs the shifted out signal to a CPU 614.

According to the signal input from the shift register E 617, a first count 615 and a second count 616 in the CPU 614 and the preset control program, the CPU 614 outputs the signals SELA618, WRA619, SELB620, WRB621, SFTB622, SELD623, WRD624 and SFTE625.

Referring next to FIGS. 8 and 9, the operation of the CPU 614 in the conventional system will be described below.

Firstly, the value 1 is given for the signal SELA618 and the signal WRA619 so as to initialize and provide "1" to the register A 607, which holds the exponentiation remainder operation result (Step 701). The first count 615 is initialized to 0 (Step 702). Then, the signal SELB 620 is set to 0 and the signal WRB 621 to 1, which causes the content of the register A 607 to be copied to the shift register B 610 (Step 703). Then, the subroutine "mulmod" is executed, i.e. the remainder of the division where the multiplication result of the values in the register A 607 and the shift register B 610 is divided by parameter N is sent to the register A 607 (Step 704). Thus, the content of the register A 607 is squared.

Then, the signal SFTE 624 is set to 1 so as to shift the content of the shift register E 617 to the left by one bit (Step 705). Then the bit shifted out from the shift register E 617 is checked to see whether or not it is 1 (Step 706). When the shifted out bit is 1, the value 1 is output for the signal SELB620 and 1 to the signal WRB621. This causes the content of the register X 608 to the shift register B 610 (Step 707). Then, the subroutine MULMOD is executed (Step 708). Thus, when the bit shifted out from the shift register E 617 is 1, the content of the register A 607 is multiplied by parameter X. When the shifted out bit is 0, the multiplication by X is not executed.

Here, the first count 615 is increased by one (Step 709), and then checked to see whether or not the first count 615 is n (Step 710). When the first count 615 is not n, the system goes back to Step 703. Thus, the processes of Steps 703 to 709 are repeated for n times, which corresponds to the bit length of the parameters. When the first count 615 is n, the system terminates the processing. Upon termination, the register A 607 has the exponentiation remainder operation result.

The subroutine mulmod comprises the operation as described below.

Firstly, the signal SELD 623 is set to 1 and the signal WRD 624 to 1 so that the content of the register D is initialized to have 0 (step 801). The second count 616 is also initialized to 0 (Step 802). Then, the signal SFTB 622 is set to 1 and the content of the shift register B 610 is shifted to the left by one bit (Step 803). Thus, the output m626 of the first adder becomes (2× Content of register D 602+ Content of register A 607× shifted out value from the shift register B 610).

At the same time, the output M627 from the second adder becomes (signal m626+ content of register K 612× (quotient obtained by division of signal m626 by parameter N)).

Then, the signal SELD 623 is set to 1 and the signal WRD 624 to 1, so that the second adder output M627 is written to the register D 602 (Step 804). Here, the second count number 616 is increased by one (Step 805), and checked to see whether or not the second count number 616 is (n+8) (Step 806). If not, the system reruns to Step 803. Thus, the processes of Steps 803 to 806 are repeated for (n+8) times, which is the value obtained by adding 8 to the bit length n of the parameters. If the second count number 616 is (n+8), the value 0 is given as the signal SELA 618 and as the signal WRA 620, which causes the content of the register D 602 to be copied to the register A 607 (Step 807). Then, the system returns to the main routine. At this stage, the content of the register A 607 is the remainder of the division by parameter N of the multiplication result of the value in the register A 607 and the shift register B 610.

Now referring to FIGS. 10, 20, 21 and 22, the register D 602, the register A 607, the shift register B 610 and the one-bit left shifter are described.

As shown in FIG. 10, the register D 602 comprises a register DH 901 with a bit length of (n+10) and a register DL 902 with a bit length of (n+10). According to the signal WRD624, they store the signal input from the selector D 601 individually, and output their contents individually. The register DH 901 and the register DL 902 assign the most significant bit to the bit (n+1) and then the following bits to n, (n−1) and so on, so that the least significant bit is assigned to the eighth bit below 0. Unless otherwise specified, the signals with the same bit numbers hereafter correspond each other.

As shown in FIG. 20, the register A 607 comprises a register AH 903 with a bit length of n and a register AL 904 with a bit length of n. According to the signal WRA 619, they individually store the input signal and individually output their contents. The register AH 903 and the register AL 904 assign the most significant bit to the bit (n−9) and the following bits to bit (n−10), (n−11) and so on, to have the least significant bit at the eighth bit below 0.

As shown in FIG. 21, the shift register B 610 comprises a shift register BH 905 having a bit length of n and a shift register BL 906 having a bit length of n and an n-bit-long one-bit right shifter 907. The n-bit-long one-bit right shifter 907 shifts the input signal to the right by one bit and outputs the shift result to the shift register BH 905, with placing 0 for the most significant bit.

The shift register BH 905 and the shift register BL 906 individually store the input signals according to the signal WRB621 and upon the signal SFTB622, shift the contents to the left by one bit. Then, the shifted out bits are output separately. Specifically, when the shift register BL 906 shifts out the bit k, the shift register BH 905 outputs the bit after one-bit shifting to the right with the n-bit-long one-bit right shifter 907, or the bit (k+1) of the input signal. The input signal of the bit k in the shift register B is represented by the value of the bit (k+1)×2.

As shown in FIG. 22, the one-bit left shifter A 601 comprises wire connections only, as shown in a block 908. The bit length of the one-bit left shifter A601 is m, as shown in the figure. With the configuration in the figure, the one-bit left shifter A 601 can output the input signal for the bit k to the bit (k+1). It outputs 0 to the least significant bit. An m-bit-long one-bit right shifter can be similarly defined. Specifically, an m-bit-long one-bit right shifter outputs the bit k of the input signal to the bit (k−1), with outputting 0 for the most significant bit.

FIG. 11 shows a block diagram of an r-bit-long delay adder, used in the first and the second adders 604 and 605. An r-bit-long AND operator 1001 outputs the AND of the bit k in the r-bit input b and the bit K in the r-bit input c to the bit k.

An r-bit-long XOR operator 1002 outputs the exclusive OR of the bit k in the r-bit input b and the bit k in the r-bit input c to the bit k. The r-bit-long one-bit left shifter 1003 shifts the data from the r-bit-long AND operator 1001 to the left by one bit and outputs the result to an r-bit-long OR operator 1004.

The r-bit-long OR operator 1004 outputs the OR of the bit k in the r-bit input data a and the bit k in the r-bit input data from the r-bit-long one bit left shifter 1003 to the bit k. An r-bit-long AND operator 1005 outputs the AND of the bit k in the input from the r-bit-long OR operator 1004 and the bit k of the data from the r-bit-long XOR operator 1002.

An r-bit-long XOR operator 1006 outputs the exclusive OR of the bit k in the input data from the r-bit-long OR operator 1004 and the bit k in the data from the r-bit-long XOR operator 1002 as the bit k of r-bit output signal L.

An r-bit-long one-bit left shifter 1007 shifts the data from the r-bit-long AND operator 1005 to the left by one bit and outputs as r-bit output signal H. Note that the r-bit-long one-bit left shifters 1003 and 1007 have the same configuration as the one-bit left shifter A601 of FIG. 22 except for the bit length. The sum of the outputs H and L from the r-bit-long delay circuit with the configuration as described above is represented as the output HL. The value of HL is equal to the addition result obtained by (input a+input b)+input c. Further, as easily understood from the configuration, the input signal passes through only three logical operation units before attaining the outputs H and L. When compared with ordinary adders with carry transmission, it has delay time for only three steps of logical units, which enables much more rapid addition operation.

Referring next to FIG. 12, the configurations and procedures at the (A×s) multiplier 613 and the first adder 604 will be described below.

The procedure at the (A×s) multiplier 613 is as follows. An (n+1)-bit-long one-bit left shifter 1101 has 0 at the most significant bit and the signal from the register AL 904 at the lower n bits and outputs the value with one bit shifting to the left to a selector 1102.

The selector 1102 receives the shifted out bit of the shift register BH 905 at bit 1 and the shifted out bit from the shift register BL 906 at bit 0 of the selection signal. The output from the selector 1102 to a (n+10)-bit-long delay adder 1105 depends on the value represented by bits 1 and 2 of the selection signal. When the value is 0, the selector 1102 outputs 0 for (n+1) bits; when it is 1, the selector 1102 outputs the most significant bit and the input data from the register AL 904 to the lower n bits, and when it is 2, the selector 1102 outputs the input signal from the (n+1)-bit-long one-bit left shifter 1101 for the lower (n+1) bit of the input c at the (n+10)-bit-long delay adder 1105. In this conventional example, the sum of the shifted out bits does not become 3.

An (n+1)-bit left shifter 1103 and as selector 1104 operates with the similar procedure except that their input signal is from register AH 904 and the output is sent to the (n+10)-bit-long delay adder 1106. Thus, the result of multiplication where the value from the register A 607 is multiplied by the shifted out bit value from the shift register B 610 can be output.

The first adder 603 has the configuration and procedure as described below. The (n+10)-bit-long delay adder 1105 receives, as the input a, the value obtained by shifting the value in the register DH 901 to the left by one bit with the one-bit left shifter 603, i.e. the signal twice the value in the register DH 901. As the input b, it receives the value obtained by shifting the value in the register DL 902 to the left by one bit with the one-bit left shifter 603, i.e. the signal twice the value in the register DL 902. As the input c, it receives 0 for the higher nine bits and the output signal from the selector 1102 for the lower (n+1) bits.

The (n+10)-bit-long delay adder 1106 receives, as the input a, the output signal H from the (n+10)-bit-long delay adder 1105 and as the input b, the output signal L from the (n+10)-bit-long delay adder 1105, and as the input c, 0 for the higher nine bits and the output signal from the selector 1104 for the lower (n+1) bits. The output signal H is referred to as mH, the output signal L as mL, and the mH and mL are collectively referred to as the signal m626.

Under the operation at the r-bit-long delay adder as above, the result of the outputs mL and mH becomes equal to the value obtained by this formula: Content of register D 602×2+ Content of register A 607× shifted out bits from shift register B.

Referring now to FIG. 13, the second adder 605 has the configuration and procedure as described below.

An (n+8)-bit-long delay adder 1201 receives, as the input a, the lower (n+8) bits of the output mH from the (n+10)-bit-long delay adder 1106 and as the input b, the lower (n+8) bits of the output mL from the (n+10)-bit-long delay adder 1106 and as the input c, the signal tK628 for the higher n bits and 0 for the lower 8 bits respectively. The most significant bit of the output H and the most significant bit of the output L from the (n+8)-bit-long delay adder 1201 are input to an XOR operator 1202. The XOR operator 1202 outputs the exclusive OR of the most significant bit of the output H and the most significant bit of the output L from the (n+8)-bit-long delay adder 1201.

The higher three bits of the output signal MH 1203 with a length of (n+10) bits always have 0, and the lower (n+7) bits have the values at the lower (n+7) bits of the output H from the (n+8)-bit-long delay adder 1201.

The higher two bits of the output signal ML 1204 are always 0, the third bit from the most significant bit has the output signal from the XOR operator 1202 and the lower (n+7) bits have the same values as the lower (n+7) bits of the output L from the (n+8)-bit-long delay adder 1201.

The signal MH 1203 and the signal ML 1204 are collectively referred to as the signal M627. The value obtained by adding the signal MH1203 and the signal ML1204 is the same as the lower (n+8) bits of (mH+mL)+tK.

Referring now to FIG. 14, the configuration and procedure for the (K×(a+N)) operator 613 are described below.

A six-bit-long one-bit left shifter 1315 outputs, to a six-bit-long delay adder 1302, the higher six bits of the output from the register K 612 with shifting it to the left by one bit. The six-bit-long delay adder 1301 receives, as the input a, the higher six bits of the signal mH1107 and as the input b, the higher six bits of the signal mL1108, and as the input c, the higher six bits of the output signal from the register K 612 respectively. Bits 5 and 4 of the output H are sent to a two-bit adder 1305 and bit 3 to an AND operator 1303; From the output L, bits 5 and 4 are sent to a two-bit adder 1307 and bit 3 to the AND operator 1303.

The six-bit-long delay adder 1302 receives, as the input a, the higher six bits of the signal mH1107 and as the input b, the higher six bits of the signal mL1108, and as the input c, the output signal from the six-bit-long one-bit left shifter 1315 respectively. Bits 5 and 4 of the output H are sent to a two-bit adder 1306 and bit 3 to the AND operator 1304; bits 5 and 4 of the output L are sent to a two-bit adder 1308 and bit 3 to the AND operator 1304.

The AND operator 1303 outputs, to the two-bit adder 1305, the AND of bit 3 of the output H and bit 3 of the output L from the six-bit-long delay adder 1301. The AND operator 1304 outputs, to the two-bit adder 1306, the AND of bit 3 of the output H and bit 3 of the output L from the six-bit-long delay adder 1302.

The two-bit adder 1305 outputs, to the two-bit adder 1307, a two-bit result of the addition where a two-bit value represented by bits 5 and 4 of the output H from the six-bit-long delay adder 1301 is added to another two-bit value having 0 at bit 1 and the output from the AND operator 1303 at bit 0.

The two-bit adder 1306 outputs, to the two-bit adder 1308, a two-bit result of the addition where a two-bit value represented by bits 5 and 4 of the output H from the six-bit-long delay adder 1302 is added to another two-bit value having 0 at bit 1 and the output value from the AND operator 1304 at bit 0. The two-bit adder 1307 outputs, to a comparator (a=1) 1309, a two-bit result of the addition where a two-bit value represented by bits 5 and 4 of the output L from the six-bit-long delay adder 1301 is added to the output signal from the two-bit adder 1305.

The two-bit adder 1308 outputs, to a comparator (a=2) 1310, a two-bit result of the addition where a two-bit value represented by bits 5 and 4 of the output L from the six-bit-long delay adder 1302 is added to the output signal from the two-bit adder 1306.

The comparator (a=1) 1309 outputs, to the AND operator 1312, the value 1 when the input a from the two-bit adder 1307 is equal to 1 and the value 0 when the input a is not equal to 1. The comparator (a=2) 1310 outputs, to a NOT operator 1311 and to bit 1 of the selection signal for the selector 1314, the value 1 when the input a from the two-bit adder 1308 is equal to the value 2 and 0 when it is not equal to 2.

The NOT operator 1311 outputs the logical NOT of the input from the comparator (a=2) 1310 to the AND operator 1312.

The AND operator 1312 outputs, to bit 0 of the selection signal for the selector 1314, the AND of the input from the comparator (a=1) 1309 and the NOT operator 1311. Thus, the two-bit value represented by bits 1 and 0 of the control signal input for the selector 1314 becomes 2 when the value obtained by adding the AND of bit 3 of the operation result H and bit 3 of the operation result L to the higher two bits of the result of (mH+mL)+K×2 is 2. It becomes 1 when the value obtained by adding the AND of bit 3 of the operation result H and bit 3 of the operation result L to the higher two bits of the operation result of (mH+mL)+K is equal to 1. It becomes 0 for other cases. This is the quotient of the division where the signal m626 is divided by the parameter N. In this conventional example, the quotient value is limited to 0, 1 and 2.

An n-bit-long one-bit left shifter 1313 shifts the signal input from the register K 612 to the left by one bit and outputs the shifted value to the selector 1314. The selector 1314 outputs, as the signal tK628, the signal input from the n-bit-long one-bit left shifter 1313 when the selection signal is 2 and the input from the register K 612 when it is 1 and 0 when it is 0.

In other words, the value of the signal tK 628 is equal to the result of multiplication where the value at the register K 612 is multiplied by the value of the selection signal. Thus, the signal tK627 is equal to the value obtained by multiplying the content of the register K 612 by the quotient of the division where the signal m626 is divided by parameter N.

Conventionally, an n-bit-long exponentiation remainder operation circuit makes all operations with a unit of n bits. This means that, for n-bit long exponentiation, the subroutine MULMOD is required to be performed for 2×n times at most, because, as shown in FIG. 8, the subroutine MULMOD is executed in Steps 704 and 708 in the loop processing for n times.

Therefore, if the value of n is large, operations must be repeated for many times. In the case of RSA coding, for example, exponentiation remainder operation for 512 bits, 1024 times of multiplication remainder operations may be required at most. Described below is such a system where the number of system clocks n is 512, with considering one step in the flowcharts of FIGS. 8 to be one clock.

The subroutine MULMOD is 2+(n+8)×4+1, and in this case, it has 2083 clocks (2+(512+8)×4+1=2083). The main routine may have, at the longest, a length of 2×n×(6+MULMOD+MULMOD), which is, in this case, 2+512×(6+2083+2083)=2134018 clocks. Thus, a conventional exponentiation remainder operation circuit requires a quite lengthy processing time when the operation bit length n is a large value.

SUMMARY OF THE INVENTION

It is an object of the present invention to provide an exponentiation remainder operation circuit which enables operations at a speed four times higher than that in the conventional technology.

In order to accomplish the above-mentioned and other objects, an exponentiation remainder operation circuit, according to one aspect of the invention comprises:

first exponentiation remainder operator for performing exponentiation remainder operation for n/2 bit length parameter, in which n is even number;

second exponentiation remainder operator for performing exponentiation remainder operation for n/2 bit length parameter;

first adder/subtractor for performing addition and subtraction for n/2 bit length parameter;

second adder/subtractor for performing addition and subtraction for n/2 bit length parameter; and control means performing exponentiation remainder operation for n bit length parameter by controlling exponentiation remainder operation of the first exponentiation remainder operator for upper n/2 bits of the n bit length parameter, exponentiation remainder operation of the second exponentiation remainder operator for lower n/2 bits of the n bit length parameter, and addition and subtraction of the results of operations of the first and second exponentiation remainder operators by the first and second adder/subtractors.

In the preferred construction, the control means comprises:

first and second selection means for controlling selection whether a carry signal is used in the operation of the first exponentiation remainder operator and the first adder/subtractor;

CPU for outputting a control signal for controlling operations of the first and second exponentiation remainder operators and the first and second adder/subtractors; and storage portion for storing the n-bit parameter as an object of operation, intermediate and final results of operations by the first and second exponentiation remainder operators and the first and second adder/subtractors.

In the preferred construction, the first exponentiation remainder operator inputs the output signal of the first selection means as a carry input signal and a first control signal controlling whether the input carry signal is used for operation or not, and selects one of exponentiation remainder operation and multiplying remainder operation as operation to be executed based on a second control signal;

the second exponentiation remainder operator inputs a carry input signal and a fixed value 0 as the first control signal for controlling whether the input carry signal is used for operation or not, selects one of exponentiation remainder operation and multiplication remainder operation as operation to be executed based on a second control signal, and outputs a carry output signal to the first selection means; and the control means makes the first and second exponentiation remainder operators to operate simultaneously in parallel.

In the preferred construction, the first adder/subtractor inputs the output signal of the second selection means as a carry input signal and a third control signal for selecting one of addition and subtraction as operation to be executed; and the second adder/subtractor inputs 0 as a carry input signal and the third control signal for selecting one of addition and subtraction as operation to be executed, and outputs a carry output signal to the second selection means.

In the preferred construction, the first selection means inputs the first control signal for performing switching control for switching the output signal between 0 and the carry output signal from the second exponentiation remainder operator; and the second selection means inputs the first control signal for performing switching control for switching the output signal between 0 and the carry output signal from the second adder/subtractor.

In the preferred construction, the storage portion includes n/2 bit length of first to tenth registers, in which the first register stores the upper n/2 bit of the n-bit parameter as the objection for operation or the upper n/2 bit of the n-bit length parameter as the final result, the second stores the lower n/2 bits of the n-bit length parameter as the object for operation or the lower n/2 bit of n-bit length parameter as the final result of operation;

the third to tenth registers stores input values to be used in the operations of the first and second exponentiation remainder operators and the first and second exponentiation remainder operators and the first values to be used in the operations of the first and second exponentiation remainder operators and the first and second adder/subtractors, and intermediate results of operations of the first and second exponentiation remainder operators and the first and second adder/subtractors.

In the preferred construction, the CPU unitedly operates the first and second registers as a n-bit length single register when the final results of the first and second exponentiation remainder operators and the first and second adder/subtractors are stored.

In the preferred construction, the control means performs exponentiation remainder operation for deriving a remainder of division of a result obtained by exponentiation of the parameter C by a parameter E as an exponent, by a parameter N, wherein C, E, N are n-bit length integers, through the meanses comprising:

means for deriving first and second remainder operation results as remainders of division of first and second prime numbers P and Q by the parameter C when the parameter N is expressed by n/2 bit length of two prime numbers, by the first and second exponentiation remainder operators;

means for deriving a third remainder operation result expressed by a sum of two n/2 bit length values, which is the remainder in the division of the result of exponentiation of the first remainder operation result by a parameter EP as remainder of division of a parameter (P−1) by the parameter E, by the first prime number P, by the first exponentiation remainder operator;

means, in parallel to such process of the first exponentiation remainder operator, for deriving a fourth remainder operation result expressed by a sum of two n/2 bit length values, which is the remainder in the division of the result of exponentiation of the second remainder operation result by a parameter EQ as remainder of division of a parameter (Q−1) by the parameter E, by the second prime number Q, by the second exponentiation remainder operator;

means for deriving a fifth remainder operation result as a remainder of division of the sum of two n/2 bit length values which is the third remainder operation result, by the parameter P, and a sixth remainder operation result as a remainder of division of the sum of two n/2 bit length values which is the fourth remainder operation result, by the parameter Q, by the first and second exponentiation remainder operators;

means for deriving a subtraction result by subtracting the fifth remainder operation result from the sixth remainder operation result by the first adder/subtractor;

means for deriving a parameter V which is n/2 bit length parameter and remainder of which is one when it is multiplied by the parameter P and then the product is divided by Q, and deriving a seventh parameter expressed by a sum of two n/2 bit length values as remainders of division of a product of the parameter V and the subtraction result by the parameter Q, by the second exponentiation remainder operator;

means for deriving an eighth remainder operation result as a remainder of division of the sum of two n/2 bit length values as the seventh remainder operation result by the parameter Q, by the first and second exponentiation remainder operators;

means for deriving a product of multiplication of the second remainder operation result by the parameter P by the first and second exponentiation remainder operators; and means for deriving a final result of the exponentiation remainder operation as a sum of the parameter C and the fifth remainder operation result.

According to another aspect of the invention, an exponentiation remainder operation circuit comprises:

first exponentiation remainder operator for performing exponentiation remainder operation for n/2 bit length parameter, in which n is even number;

second exponentiation remainder operator for performing exponentiation remainder operation for n/2 bit length parameter;

first adder/subtractor for performing addition and subtraction for n/2 bit length parameter;

second adder/subtractor for performing addition and subtraction for n/2 bit length parameter; and control means performing exponentiation remainder operation for n bit length parameter by controlling exponentiation remainder operation of the first exponentiation remainder operator for upper n/2 bits of the n bit length parameter, exponentiation remainder operation of the second exponentiation remainder operator for lower n/2 bits of the n bit length parameter, and addition and subtraction of the results of operations of the first and second exponentiation remainder operators by the first and second adder/subtractors;

the control means including:

first and second selection means for controlling selection whether a carry signal is used in the operation of the first exponentiation remainder operator and the first adder/subtractor;

CPU for outputting a control signal for controlling operations of the first and second exponentiation remainder operators and the first and second adder/subtractors; and storage portion for storing the n-bit parameter as an object of operation, intermediate and final results of operations by the first and second exponentiation remainder operators and the first and second adder/subtractors, the first exponentiation remainder operator inputs the output signal of the first selection means as a carry input signal and a first control signal controlling whether the input carry signal is used for operation or not, and selects one of exponentiation remainder operation and multiplying remainder operation as operation to be executed based on a second control signal;

the second exponentiation remainder operator inputs a carry input signal and a fixed value 0 as the first control signal for controlling whether the input carry signal is used for operation or not, selects one of exponentiation remainder operation and multiplication remainder operation as operation to be executed based on a second control signal, and outputs a carry output signal to the first selection means;

the first adder/subtractor inputs the output signal of the second selection means as a carry input signal and a third control signal for selecting one of addition and subtraction as operation to be executed;

the second adder/subtractor inputs 0 as a carry input signal and the third control signal for selecting one of addition and subtraction as operation to be executed, and outputs a carry output signal to the second selection means;

the first selection means inputs the first control signal for performing switching control for switching the output signal between 0 and the carry output signal from the second exponentiation remainder operator; and the second selection means inputs the first control signal for performing switching control for switching the output signal between 0 and the carry output signal from the second adder/subtractor.

In the preferred construction, the storage portion includes n/2 bit length of first to tenth registers, in which the first register stores the upper n/2 bit of the n-bit parameter as the objection for operation or the upper n/2 bit of the n-bit length parameter as the final result, the second stores the lower n/2 bits of the n-bit length parameter as the object for operation or the lower n/2 bit of n-bit length parameter as the final result of operation;

the third to tenth registers stores input values to be used in the operations of the first and second exponentiation remainder operators and the first and second exponentiation remainder operators and the first values to be used in the operations of the first and second exponentiation remainder operators and the first and second adder/subtractors, and intermediate results of operations of the first and second exponentiation remainder operators and the first and second adder/subtractors.

In the preferred construction, the CPU unitedly operates the first and second registers as a n-bit length single register when the final results of the first and second exponentiation remainder operators and the first and second adder/subtractors are stored.

According to another aspect of the invention, a method of an exponentiation remainder operation comprises the steps of:

providing first exponentiation remainder operator for performing exponentiation remainder operation for n/2 bit length parameter, in which n is even number;

providing second exponentiation remainder operator for performing exponentiation remainder operation for n/2 bit length parameter;

providing first adder/subtractor for performing addition and subtraction for n/2 bit length parameter;

providing second adder/subtractor for performing addition and subtraction for n/2 bit length parameter; and providing control means performing exponentiation remainder operation for n bit length parameter by controlling exponentiation remainder operation of the first exponentiation remainder operator for upper n/2 bits of the n bit length parameter, exponentiation remainder operation of the second exponentiation remainder operator for lower n/2 bits of the n bit length parameter, and addition and subtraction of the results of operations of the first and second exponentiation remainder operators by the first and second adder/subtractors;

operating the control means for controlling the first and second exponentiation remainder operators, and the first and second adder/subtractors for performing exponentiation remainder operation for deriving a remainder of division of a result obtained by exponentiation of the parameter C by a parameter E as an exponent, by a parameter N, wherein C, E, N are n-bit length integers;

deriving first and second remainder operation results as remainders of division of first and second prime numbers P and Q by the parameter C when the parameter N is expressed by n/2 bit length of two prime numbers, by the first and second exponentiation remainder operators;

deriving a third remainder operation result expressed by a sum of two n/2 bit length values, which is the remainder in the division of the result of exponentiation of the first remainder operation result by a parameter EP as remainder of division of a parameter (P−1) by the parameter E, by the first prime number P, by the first exponentiation remainder operator;

deriving, in parallel to such process of the first exponentiation remainder operator, a fourth remainder operation result expressed by a sum of two n/2 bit length values, which is the remainder in the division of the result of exponentiation of the second remainder operation result by a parameter EQ as remainder of division of a parameter (Q−1) by the parameter E, by the second prime number Q, by the second exponentiation remainder operator;

deriving a fifth remainder operation result as a remainder of division of the sum of two n/2 bit length values which is the third remainder operation result, by the parameter P, and a sixth remainder operation result as a remainder of division of the sum of two n/2 bit length values which is the fourth remainder operation result, by the parameter Q, by the first and second exponentiation remainder operators;

deriving a subtraction result by subtracting the fifth remainder operation result from the sixth remainder operation result by the first adder/subtractor;

deriving a parameter V which is n/2 bit length parameter and remainder of which is one when it is multiplied by the parameter P and then the product is divided by Q, and deriving a seventh parameter expressed by a sum of two n/2 bit length values as remainders of division of a product of the parameter V and the subtraction result by the parameter Q, by the second exponentiation remainder operator;

deriving an eighth remainder operation result as a remainder of division of the sum of two n/2 bit length values as the seventh remainder operation result by the parameter Q, by the first and second exponentiation remainder operators;

deriving a product of multiplication of the second remainder operation result by the parameter P by the first and second exponentiation remainder operators; and deriving a final result of the exponentiation remainder operation as a sum of the parameter C and the fifth remainder operation result.

According to another aspect of the invention, in a system including first exponentiation remainder operator for performing exponentiation remainder operation for n/2 bit length parameter, in which n is even number, second exponentiation remainder operator for performing exponentiation remainder operation for n/2 bit length parameter, first adder/subtractor for performing addition and subtraction for n/2 bit length parameter, second adder/subtractor for performing addition and subtraction for n/2 bit length parameter and control means controlling the first and second exponentiation remainder operators, and the first and second adder/subtractors, a process for exponentiation remainder operation for deriving a remainder of division of a result obtained by exponentiation of the parameter C by a parameter E as an exponent, by a parameter N, wherein C, E, N are n-bit length integers, comprising the steps of:

deriving first and second remainder operation results as remainders of division of first and second prime numbers P and Q by the parameter C when the parameter N is expressed by n/2 bit length of two prime numbers, by the first and second exponentiation remainder operators;

deriving a third remainder operation result expressed by a sum of two n/2 bit length values, which is the remainder in the division of the result of exponentiation of the first remainder operation result by a parameter EP as remainder of division of a parameter (P−1) by the parameter E, by the first prime number P, by the first exponentiation remainder operator;

deriving, in parallel to such process of the first exponentiation remainder operator, a fourth remainder operation result expressed by a sum of two n/2 bit length values, which is the remainder in the division of the result of exponentiation of the second remainder operation result by a parameter EQ as remainder of division of a parameter (Q–1) by the parameter E, by the second prime number Q, by the second exponentiation remainder operator;

deriving a fifth remainder operation result as a remainder of division of the sum of two n/2 bit length values which is the third remainder operation result, by the parameter P, and a sixth remainder operation result as a remainder of division of the sum of two n/2 bit length values which is the fourth remainder operation result, by the parameter Q, by the first and second exponentiation remainder operators;

deriving a subtraction result by subtracting the fifth remainder operation result from the sixth remainder operation result by the first adder/subtractor;

deriving a parameter V which is n/2 bit length parameter and remainder of which is one when it is multiplied by the parameter P and then the product is divided by Q, and deriving a seventh parameter expressed by a sum of two n/2 bit length values as remainders of division of a product of the parameter V and the subtraction result by the parameter Q, by the second exponentiation remainder operator;

deriving an eighth remainder operation result as a remainder of division of the sum of two n/2 bit length values as the seventh remainder operation result by the parameter Q, by the first and second exponentiation remainder operators;

deriving a product of multiplication of the second remainder operation result by the parameter P by the first and second exponentiation remainder operators; and deriving a final result of the exponentiation remainder operation as a sum of the parameter C and the fifth remainder operation result.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 15B is a flowchart to illustrate the subroutine ADDMOD in FIG. 2;

DESCRIPTION OF THE PREFERRED EMBODIMENT

Referring to the attached figures, the present invention will be described in detail below.

Figure 1:
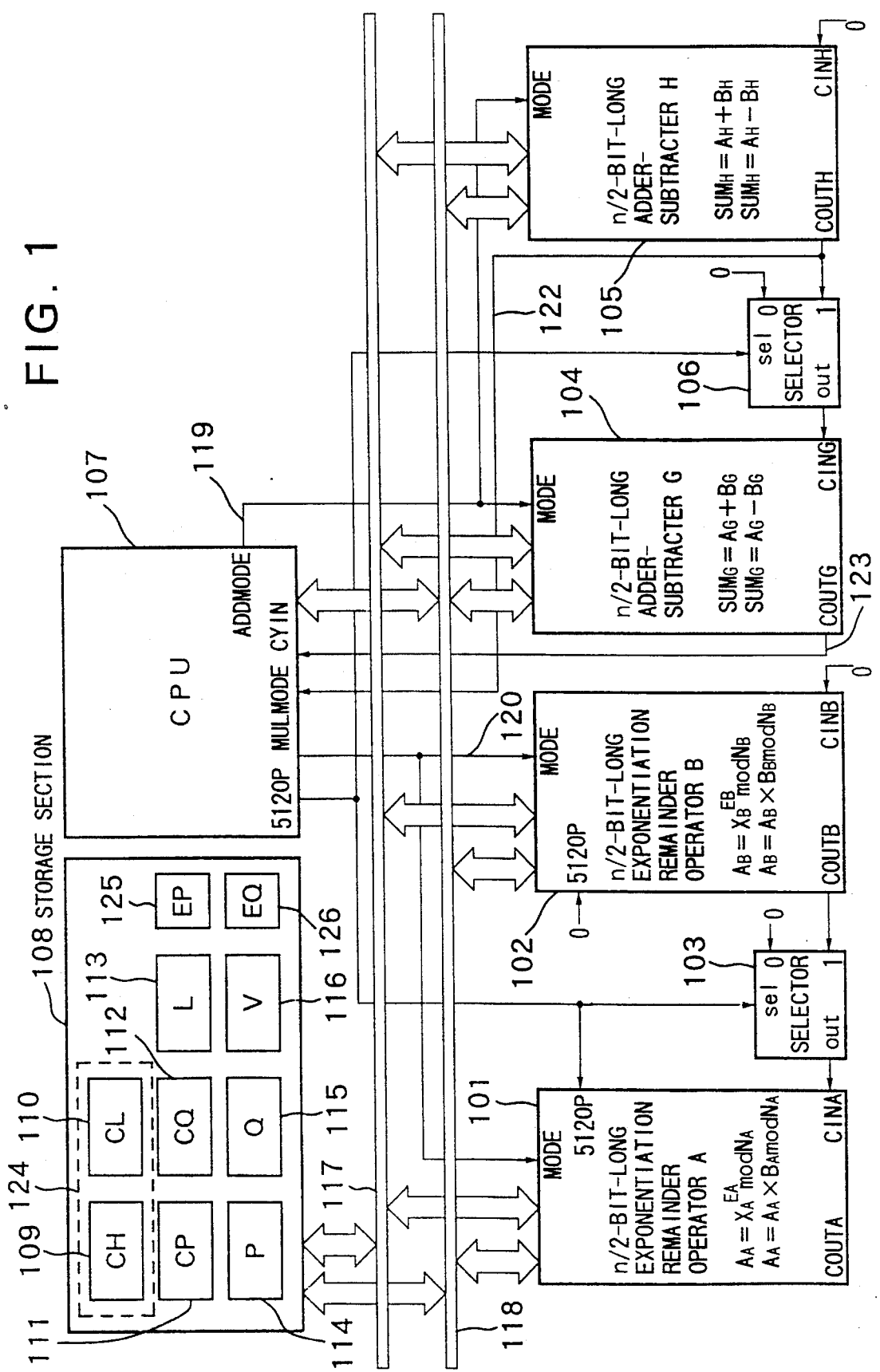
FIG. 1 is a block diagram to show an exponentiation remainder operation circuit according to an example of the present invention.

FIG. 1 is a block diagram of an example according to the present invention. It is supposed here that the exponentiation remainder operation to be executed is expressed as $C \leftarrow C^E$ mod N. Parameters C, E and N have a length of n bits. Parameter N can be represented by the product P×Q of two prime numbers P and Q, both of which have a length of n/2 bits. Parameter V is supposed to be an integer with a length of n/2 bits, which satisfies the formula V×P mod Q=1. Parameter EP is the remainder when parameter E is divided by (P–1). Parameter EQ is a remainder when parameter E is divided by (Q–1).

In FIG. 1, an n/2-bit-long exponentiation remainder operator A101 (n is an even number) receives, according to a read/write control signal from the control signal bus 118, n/2-bit-long integers AA, XA, EA, NA and BA via a data bus 117. It also receives a MULMODE signal 120. The n/2-bit-long exponentiation remainder operator A101 executes an operation AA←XA$^{EA}$ mod NA when the MULMODE signal 120 is 0, and an operation AA←AA×BA mod NA when the signal 120 is 1. According to the read/write control signal input from the control signal bus 118, it outputs AA to the data bus 117. Here, the operation result AA is expressed as a sum of two n/2-bit-long values including AAH and AAL as in the conventional example and output as AAH and AAL to outside.

The n/2-bit-long exponentiation remainder operator A 101 receives a carry signal from a lower operator and outputs another carry signal to a higher operator. While the carry from the lower operator is sent via the output of the selector 103, the carry output signal to the higher operator is without any connection. When 512 control signal input is 0, the operation for n/2 bits is made without considering the carry from the lower operator; when the 512 control signal input is 1, the carry from the lower operator is taken into consideration in operation. For the 512 OP control signal input, 512 OP control signal 121 is supplied from a CPU 107. Besides, the n/2-bit-long exponentiation remainder operator A101 can individually read and write data in the internal registers to store the input and output integers via the data bus 117 using the read/write control signal input from the control signal bus 118.

An n/2-bit-long exponentiation remainder operator B102 receives, according to the read/write control signal 118, n/2-bit-long integers AB, XB, EB, NB and BB from the data bus 117. It also receives MULMODE signal 120. It executes an operation AB←XB$^{EB}$ mod NB when the MULMODE signal 120 is 0 and AB←AB×BB mod NB when the MULMODE signal 120 is 1. Then, it outputs AB to the data bus 117 according to the read/write signal input from the control signal bus 118.

The n/2-bit-long exponentiation remainder operator B102 receives a carry signal from a lower operator and outputs another carry signal to a higher operator. The value 0 is given for the carry from the lower operator, and the carry signal to the higher device is given to the selector 103. At 512OP control signal input, the n/2-bit-long exponentiation remainder operator B102 receives the value 0. Here, the operation result AB is expressed as a sum of two n/2-bit-long values including ABH and ABL as in the conventional example. For the n/2-bit-long delay adder A101 and the n/2-bit-long delay adder B102, NA and NB are replaced by their two's compliments (−NA) and (−NB). Besides, the n/2-bit-long exponentiation remainder operator B102 can individually read and write data in the internal registers to store the input and output integers via the data bus 117 using the read/write control signal input from the control signal bus 118.

The selector 103 receives 512OP signal 121. It outputs for the carry input to the n/2-bit-long exponentiation remainder operator A101, the value 0 when the 512OP signal 121 is 0 and the carry signal output from the n/2 bit long exponentiation remainder operator B102 when the 512OP signal is 1.

The n/2-bit-long adder/subtracter G104 receives n/2-bit-long integers AG and BG from the data bus 117 according to the read/write control signal input from the control signal bus 118. It further receives ADDMODE signal 119 from the CPU 107 and, if the ADDMODE signal 119 is 0, operates SUMG←AG+BG and if the ADDMODE signal 119 is 0, operates SUMG←AG−BG. Then, according to the read/write control signal input from the control signal bus 118, it outputs SUMG to the data bus 117.

The n/2-bit-long adder/subtracter G104 receives a carry from a lower operator and has a carry output 123 to a higher operator. The carry signal from the lower operator is connected to the output of the selector 106 and the carry output 123 is connected to the CPU 107. Besides, the n/2-bit-long adder/subtracter G104 can individually read and write data in the internal registers to store the input and output integers via the data bus 117 using the read/write control signal input from the control signal bus 118.

The n/2-bit-long adder/subtracter H105 receives n/2-bit-long integers AH and BH from the data bus 117 according to the read/write control signal from the control signal bus 118. It further receives ADDMODE signal 119 from the CPU 107 and, if the ADDMODE signal 119 is 0, it executes an operation SUMH←AH+BH and, if the ADDMODE signal 119 is 1, an operation SUMH←AH−BH. Then, it outputs SUMH to the data bus 117 according to the read/write control signal from the control signal bus 118.

The n/2-bit-long adder/subtracter H105 has a carry from a lower operator and a carry output 122 to a higher operator. The value 0 is given to the carry signal from the lower operator and the carry signal output 122 is given to the selector 106 and the CPU 107.

Besides, the n/2-bit-long adder/subtracter H105 can individually read/write the data in the internal register to store the input and output integers via the data bus 117 according to the read/write control signal input from the control signal bus 118. Here, the n/2-bit-long adder/subtracter G104 and the n/2-bit-long adder/subtracter H105 are not required to always has a high speed as a delay adder in the conventional example. It is not necessary to complete an operation in one clock. It is sufficient to use an adder for usual carry signal transmission.

The selector 106 outputs the carry signal output of the n/2-bit-long adder/subtracter H105 to the carry input at the n/2-bit-long adder/subtracter G104 when the 512OP signal 121 is 1. The CPU 107, according to the program stored in advance and carry signal inputs 122 and 123, outputs the read/write control signal 118, 512OP signal 121, MULMODE signal 120 and ADDMODE signal 119.

The storage section 108 comprises a register CH 109, register CL 110, a register CP 111, a register CQ 112, a register t 113, a register P 114, a register Q 115, a register V 116, a register EP 125 and a register EQ 126, all of which are storage means for a length of n/2 bits. The registers can be accessed via the data bus 117 according to the read/write control signal 118 input from the control signal bus 118. The pair of the register CH 109 and the register CL 110 can work collectively to serve as a register C 124 with a length of n bits for reading and writing.

The register CH 109 is in advance provided with the higher n/2 bits of parameter C and the register CL 110 with the lower n/2 bits of parameter C. The register P 114 is provided with parameter P and the register Q 115 with the parameter Q. The register V 116 is provided with parameter V and the register EP 125 with parameter EP, and the register EQ 126 with parameter EQ. Further, the two's compliment of the parameter P (−P) is given in advance as parameter (−NA) of the n/2-bit-long exponentiation remainder operator A101, and the two's compliment (−Q) of parameter Q is given as parameter (−NB) of the n/2-bit-long exponentiation remainder operator B102.

Figure 2:
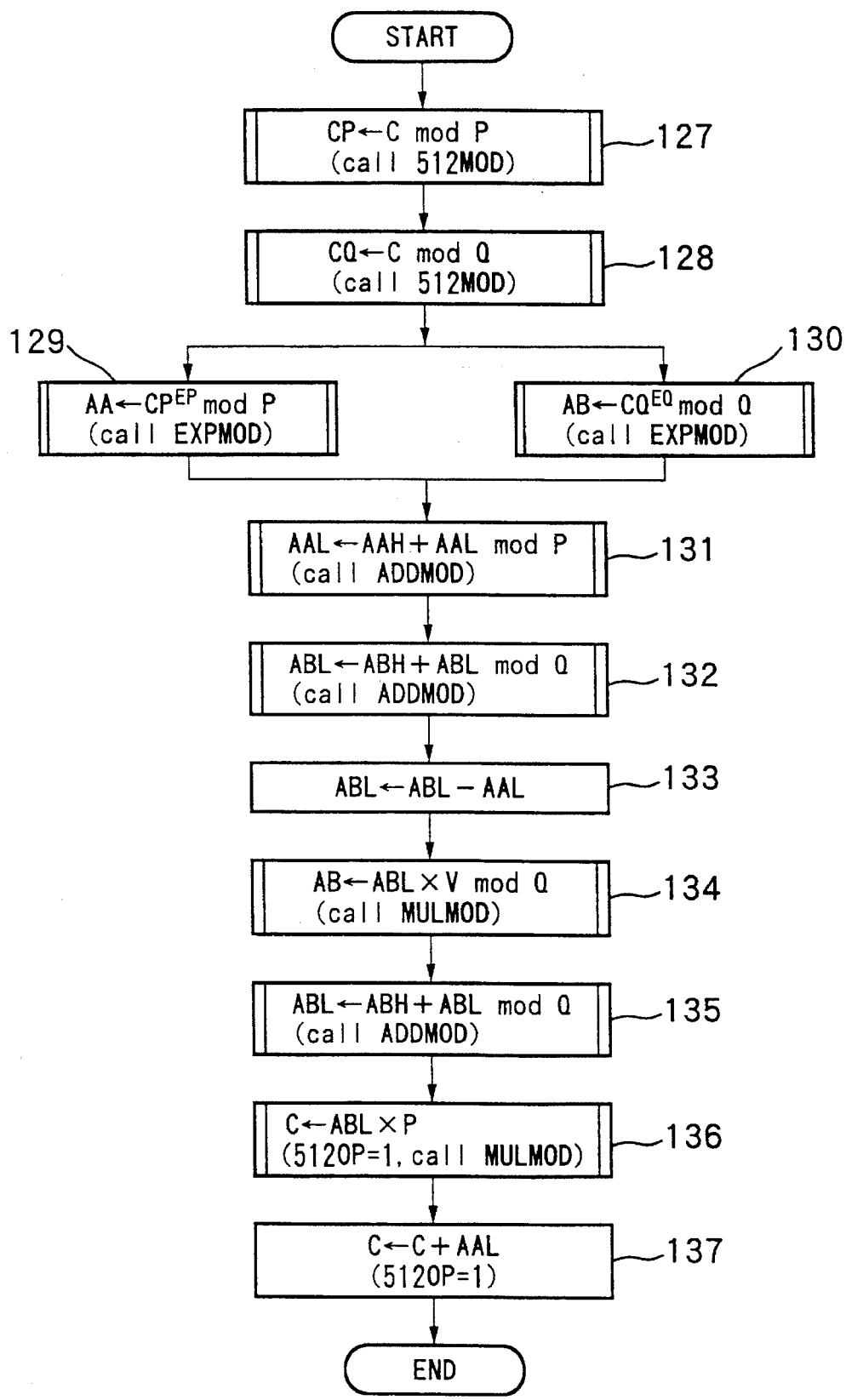
FIG. 2 is a flowchart to illustrate the operation in the example shown in FIG. 1.

Referring now to FIG. 2, the operation of the system will be described below.

It is hereafter supposed that the subroutine MULMOD using parameter P makes operation at the n/2-bit-long exponentiation remainder operator A101 and that using parameter Q makes operation at the n/2-bit-long exponentiation remainder operator B102.

Firstly, the n/2-bit-long exponentiation remainder operators A101 or B102 execute the subroutine 512MOD and cause the content of the register CP 111 to be the remainder of the division where the value in the register C 124 is divided by the value in the register P 114 (Step 127). They execute the subroutine 512MOD again and cause the value in the register CQ 112 to be the remainder of the division where the value in the register C 124 is divided by the value in the register Q 115 (Step 128). Since Steps 127 and 128 are for operation for n-bit long parameter C, the operation here is made using both of the n/2-bit-long exponentiation remainder operators A101 and B102. In Steps 131, 132 and 137 to be described later, the operation is related to n-bit-long parameters and executed in both operators.

Then, to the n/2-bit-long exponentiation remainder operator A101, the content of the register CP 111 and the content of the register EP 125 are written at the input parameters XA and EA respectively. With 0 for the MULMODE signal, the subroutine EXPMOD is executed to determine the remainder of the division where the result obtained by exponentiation of XA by EA is divided by NA. The operation results AAH and AAL are obtained here (Step 129).

Similarly, to the n/2-bit-long exponentiation remainder operator B102, the content of the register CQ 112 and the content of the register EQ 125 are written at the input parameters XB and EB respectively. Then, with 0 for the MULMODE signal, the subroutine EXPMOD is executed so that the operation results ABH and ABL are obtained (Step 130).

Steps 129 and 130 are executed in parallel using n/2-bit-long exponentiation remainder operators A101 and B102.

Next, the results AAH and AAL are read out of the n/2-bit-long exponentiation remainder operator A101. Then, the remainder of the division where the sum of AAH and AAL is divided by P is determined. The subroutine ADDMOD is executed for operation of AAH+AAL mod P and the result is written to AAL (Step 131). Next, the results ABH and ABL are read out of the n/2-bit-long exponentiation remainder operator B102. The subroutine ADDMOD is executed for operation of ABH+ABL mod Q and the result is written to ABL (Step 132). Then, to the n/2-bit-long adder/subtracter G104, ABL is written at the input parameter AG and AAL at the input parameter BG. With 1 for ADDMOD signal, ABL−AAL is operated and the result is written to ABL (Step 133).

Next, the content of the register V 116 is written to the parameter BB of the n/2-bit-long exponentiation remainder operator B102. With 1 for MULMODE signal, the subroutine MULMOD is executed so that the operation results ABL and ABH are obtained (Step 134). Similarly to Step 133, the subroutine ADDMOD is executed for operation of ABH+ABL mod Q and the result is written to ABL (Step 135).

Next, 0 is given to the input parameters XA, BA and (−NA) of the n/2-bit-long exponentiation remainder operator A101. For n/2-bit-long exponentiation remainder operator B102, content of the register P 114 is given to the input parameter BB and the value 0 to the input parameter (−NB). Then, with providing 1 for the 512OP signal 121 and 1 for the MULMODE signal 120, the subroutine MULMOD is executed in parallel at the n/2-bit-long exponentiation remainder operator A101 and n/2-bit-long exponentiation remainder operator B102. Thus, the operation of (n/2 bits) x (n/2 bits)=n bits is executed and the result is written to the register C 124 (Step 136).

Finally, the content of the register CH 109 is supplied to the input parameter AG and 0 to the input parameter BG for the n/2-bit-long adder/subtracter G104. The content of the register CL 110 is written to the input parameter AH and the output parameter AAL of the n/2-bit-long exponentiation remainder operator A101 is written to the input parameter BH for the n/2-bit-long adder/subtracter H105. Then, with providing 1 for 512OP signal 121 and 0 for ADDMODE signal 119, the operation (n bits)+(n/2 bits )=(n bits) is executed and the result is written to the register C 124 (Step 137). In the above procedure, the content of the register C 124 becomes equal to $C^E$ mod N.

Figure 15A:
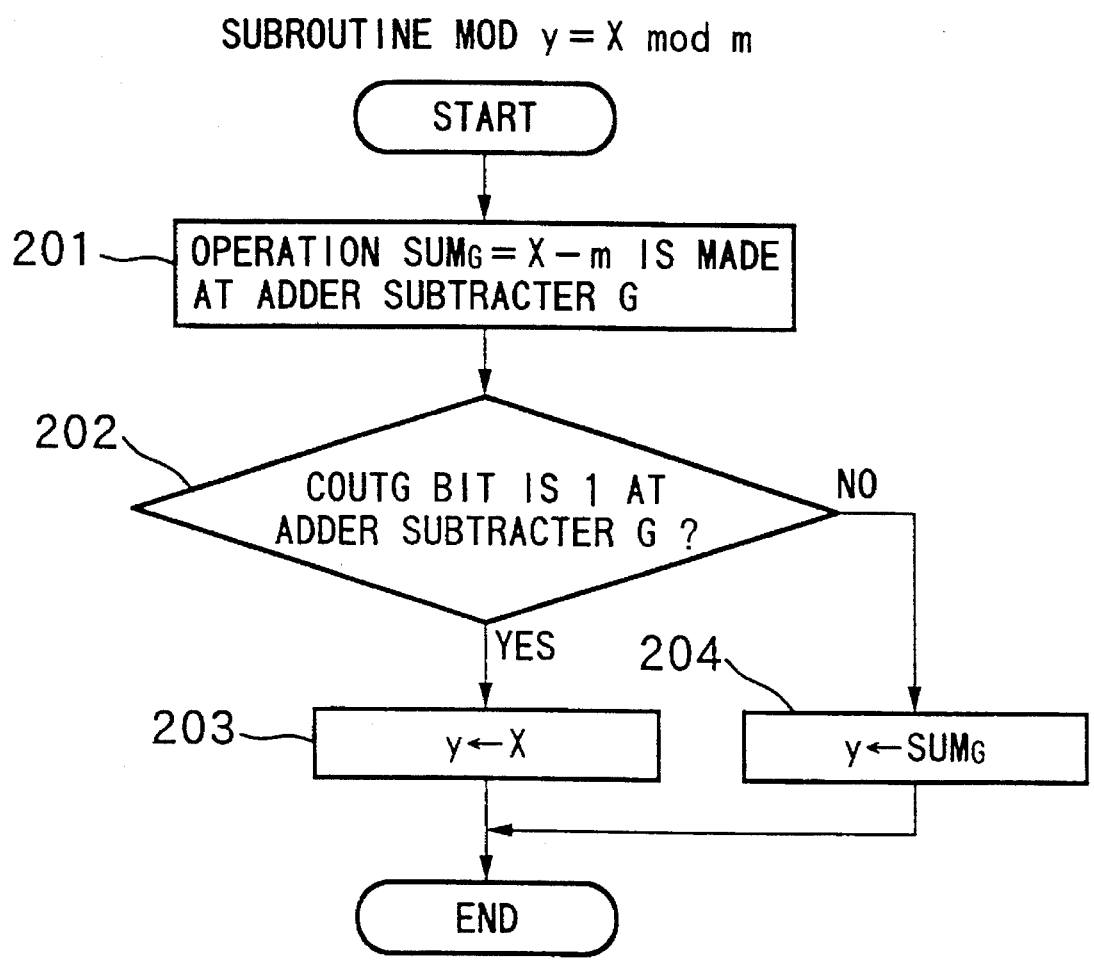
FIG. 15A is a flowchart to illustrate the subroutine MOD in FIG. 2.

Referring to FIG. 15A, the subroutine MOD y←x mod m is executed as follows. Here, m is an integer having a length of n/2 bits.

Firstly, the n/2-bit-long adder/subtracter G104 is provided with x at the input parameter AG and m at the input parameter BG. With 0 for the ADDMODE signal 119, SUMG=x−m is operated (Step 201).

The CPU 107 checks whether the carry signal output 123 from the n/2-bit-long adder/subtracter G104 is 1 or not (Step 202). If the carry signal 123 is 1, x value is written to y (Step 203) and if the carry signal 123 is 0, SUMG value is written to y (Step 204).

Referring to FIG. 15B, the subroutine ADDMOD y← x+z mod m is executed as follows. Here, x, z and m are integers having a length of n/2 bits.

For the n/2-bit-long adder-subtracter H105, x is written to the input parameter AH and z to the input parameter BH. With having 0 for ADDMODE signal 119, operation SUMH=x+z is performed (Step 205). Then, according to the subroutine MOD, y←SUMH mod m is operated (Step 206).

Figure 15C:
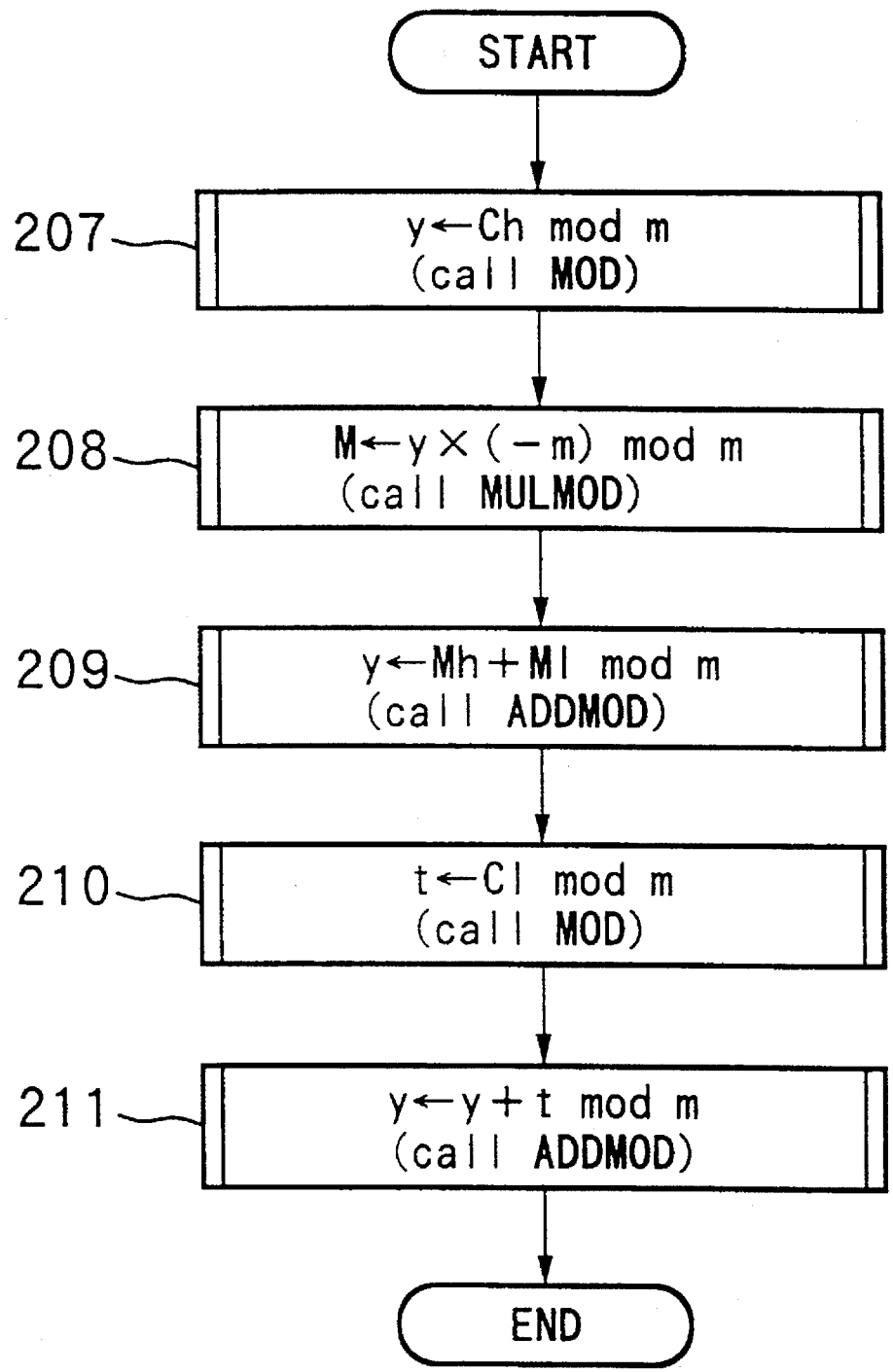
FIG. 15C is a flowchart to illustrate the subroutine 512MOD in FIG. 2.

Referring next to FIG. 15C, the subroutine 512MOD y←C mod m is executed as follows. C is an integer with a length of n bits and m is an integer with a length of n/2 bits. It is supposed here that C is divided into CH and CL, both of which have a length of n/2 bits.

Firstly, y←CH mod m is executed according to the subroutine MOD (Step 207). Then, according to the subroutine MULMOD, M←y x (−m) mod m is executed (Step 208). When m is P, the n/2-bit-long exponentiation remainder operator A101 is used and when m is Q, the n/2-bit-long exponentiation remainder operator B102 is used for operation. The parameter (−m) is obtained by transferring the parameter (−N) of the exponentiation remainder operator used for operation. The operation result M is expressed by MH and ML.

Then, according to the subroutine ADDMOD, y←MH ML mod m is operated (Step 209). The subroutine MOD is executed so that the remainder of the division where parameter CL is divided by m is written to the register t 113 (Step 210). Finally, the subroutine ADDMOD is executed to perform y←y+t mod m (Step 211).

The subroutine MULMOD is the same as the one in the conventional example. The subroutine EXPMOD is the main routine of conventional example.

Figure 3:
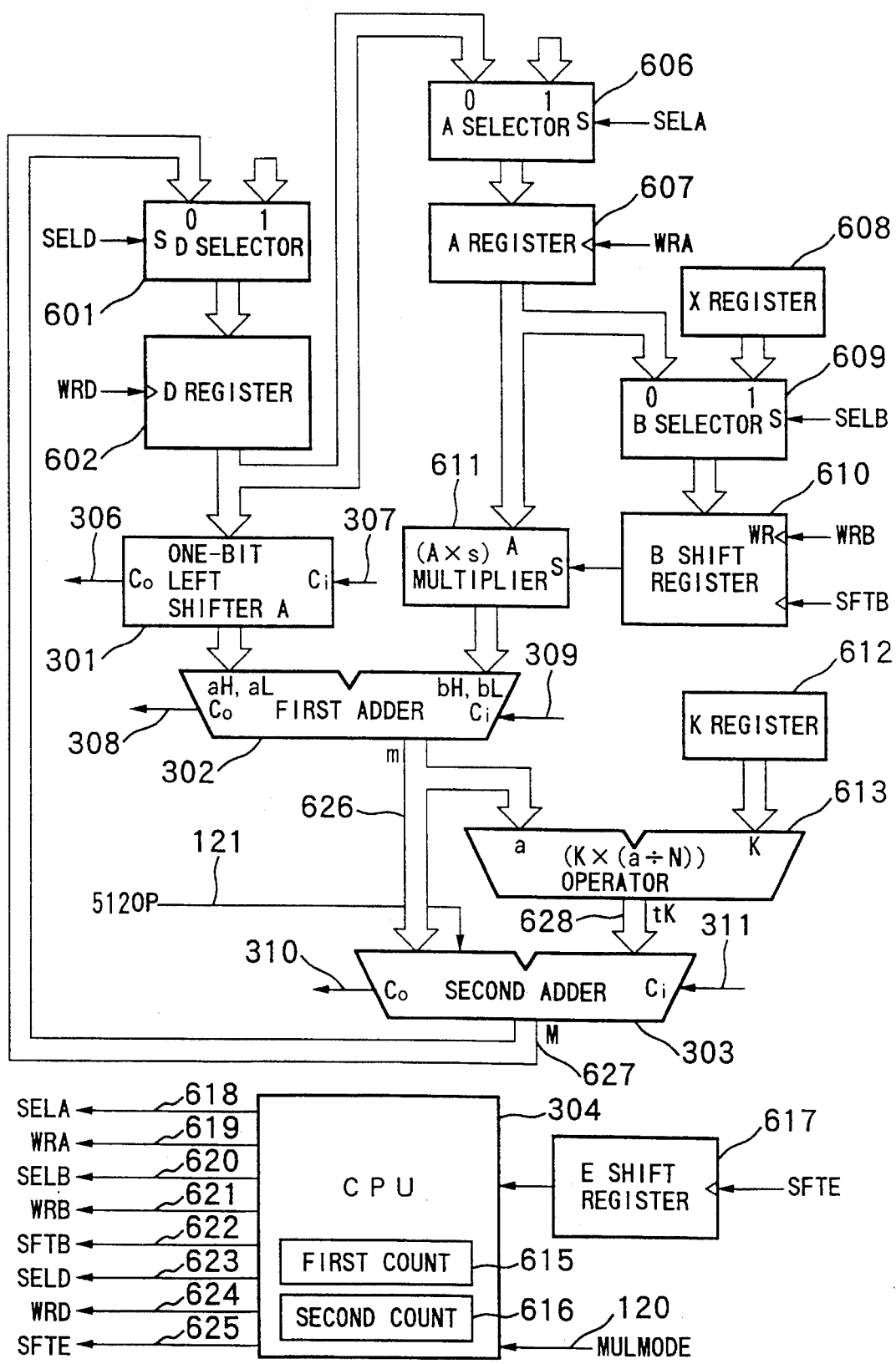
FIG. 3 is a block diagram to show the exponentiation remainder operation device for the circuit shown in FIG. 1.

The n/2-bit-long exponentiation remainder operator A101 and the n/2-bit-long exponentiation remainder operator B102 comprise exponentiation remainder operation devices as shown in the block diagram of FIG. 3.

Figure 4:
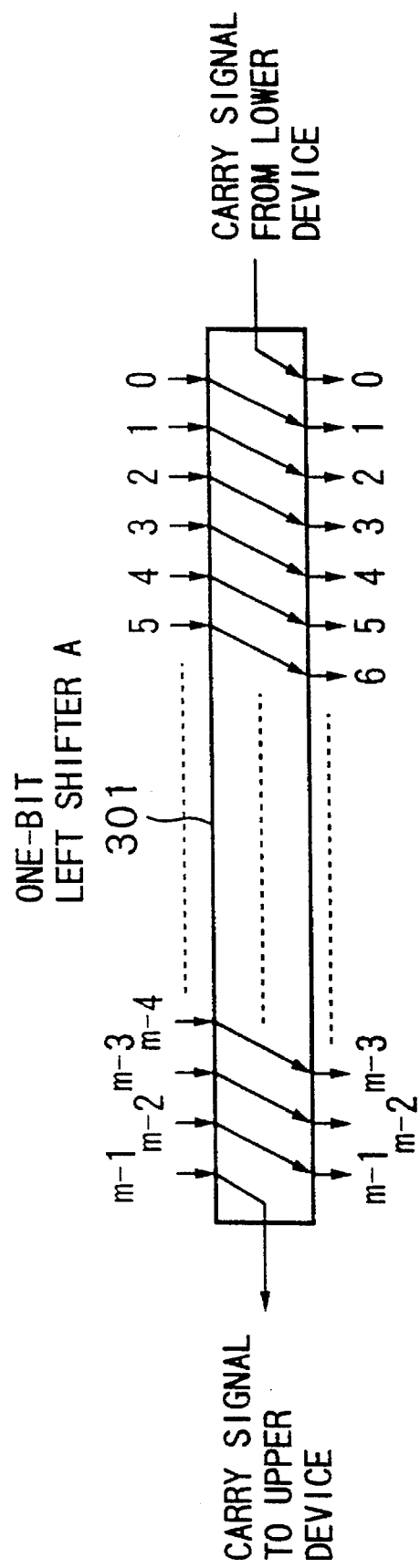
FIG. 4 is a block diagram to show a one-bit left shifter in the exponentiation remainder operation device shown in FIG. 3.

They are the same as the exponentiation remainder operator in the conventional example except for a one-bit left shifter A301, a first adder 302, a second adder 303 and a CPU 304. The one-bit left shifter A 301 shifts the input from the register D 602 to the left before output, with outputting the carry signal 307 from the lower operator for the least significant bit. It also outputs the most significant bit of the input from the register D 602 to outside as the carry signal 306 for the higher operator (See FIG. 4).

The first adder 302 sums up the input from the one-bit left shifter A 301, the input from the (A×s) multiplier 611 and the carry signal 309 from the lower operator. Then, it outputs the sum result to the second adder 303 and the (K×(a+N)) operator 613 as the signal m 626 and at the same time outputs the carry signal 308 for higher operator to outside. The second adder 303 operates, when the 512 OP control signal input 121 is 0, to add the signal input from the first adder 302 to the input from the (K×(a+N)) operator 613 and, when the 512 OP control signal input 121 is 1, to sum up the signal input from the first adder 302, the input from the (K×(a+N)) operator 613 and the carry signal 311 from the lower operator. Besides, it outputs the operation result to the selector D 601 as the signal M627 and outputs to outside the carry signal 310 for the higher operator.

The CPU 304 executes EXPMOD subroutine when the MULMODE control signal is 0, and executes MULMOD subroutine when the MULMODE control signal is 1. Except this point, this CPU is the same as the CPU 614 in the conventional example.

Figure 5:
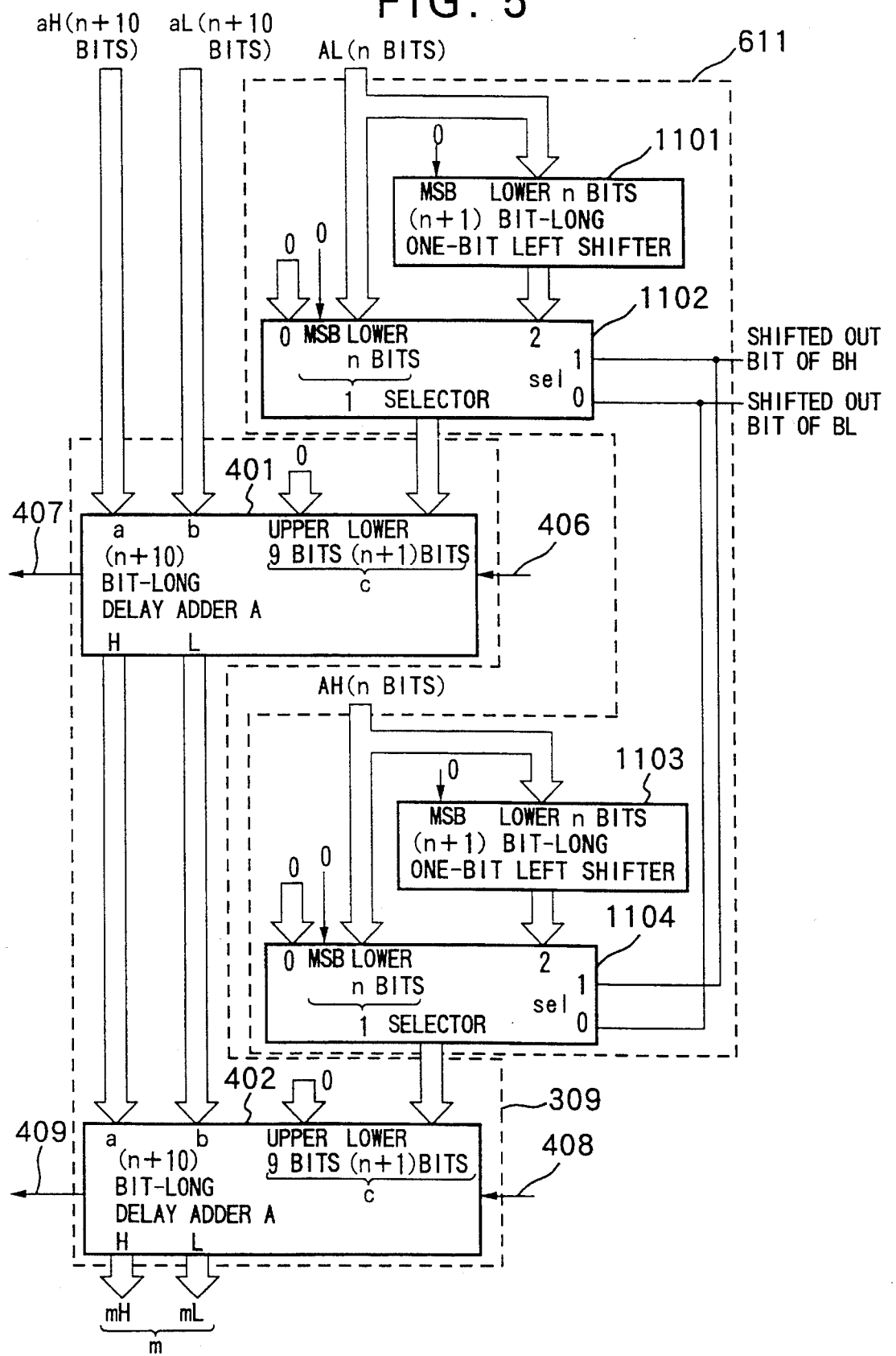
FIG. 5 is a block diagram to show a first adder in the exponentiation remainder operation device shown in FIG. 3.

FIG. 5 is a block diagram of the first adder 302. The first adder 302 has the same configuration as the first adder 604 in the conventional example except for an (n+10)-bit-long delay adder A 601 and an (n+10)-bit-long delay adder 402.

The (n+10)-bit-long delay adder A401 adds the inputs a, b and c, all of which have (n+10) bits in length, to the carry signal 406 from the lower operator so as to generate the output signals H and L and output the carry signal 407 for the higher operator. The (n+10)-bit-long delay adder B402 adds the inputs a, b and c, all of which have (n+10) bits in length, to the carry signal from the lower operator 408 so as to generate output signals H and L and output a carry signal 409 for the higher operator.

Figure 11:
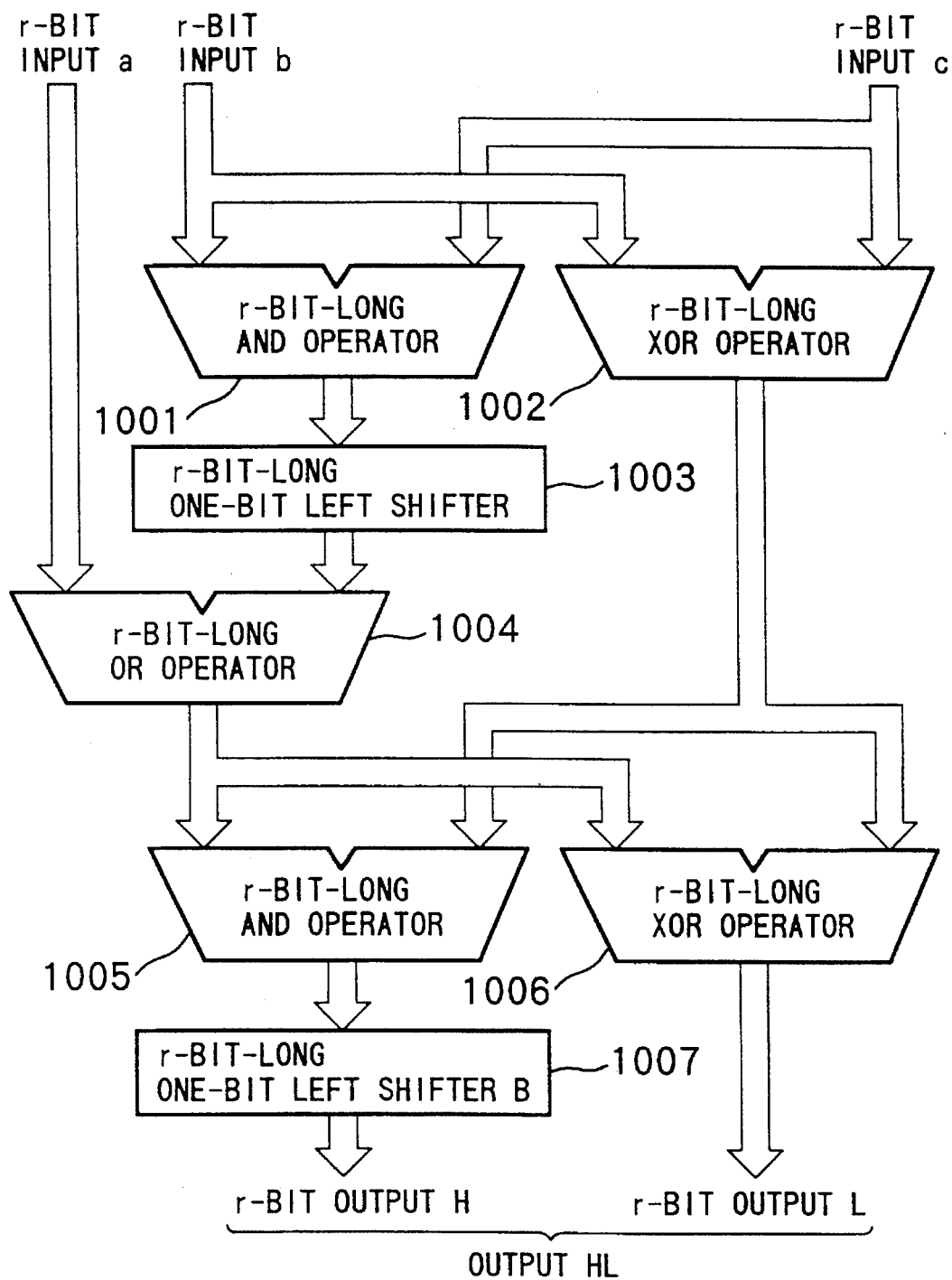
FIG. 11 is a block diagram of a delay adder.
Figure 12:
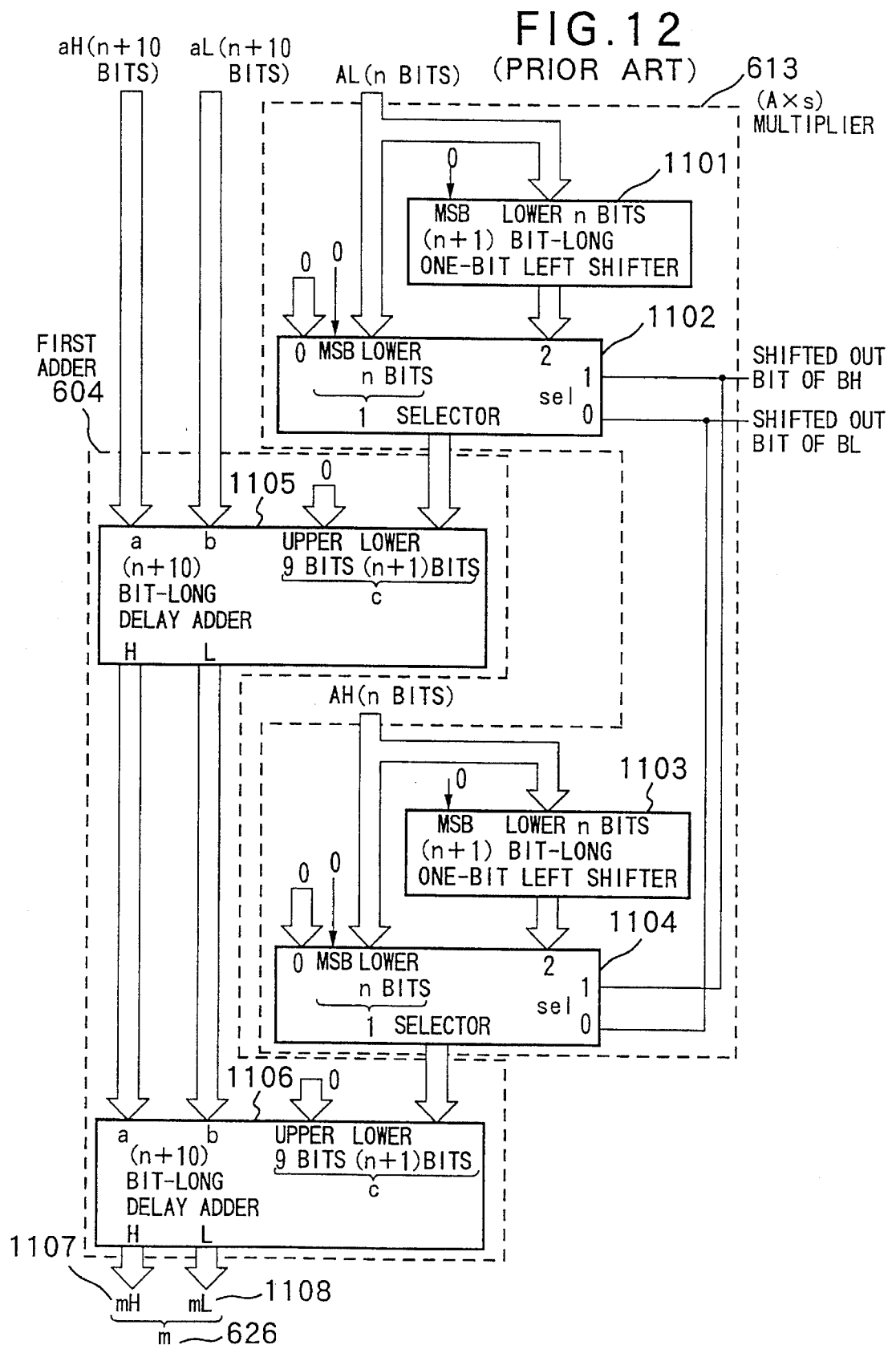
FIG. 12 is a block diagram of the (A×S) multiplier and the first adder in FIG. 7.
Figure 13:
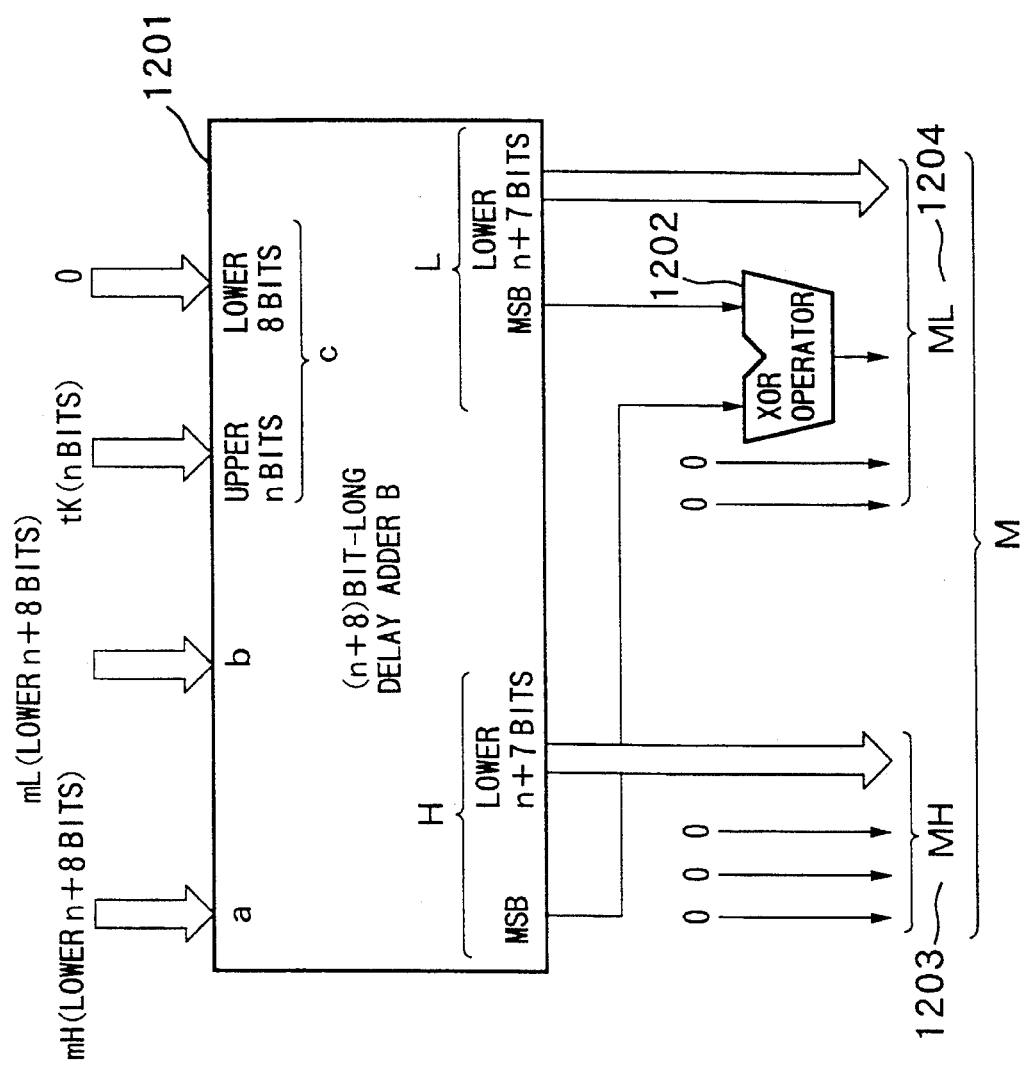
FIG. 13 is a block diagram of the second adder as shown in FIG. 7.
Figure 14:
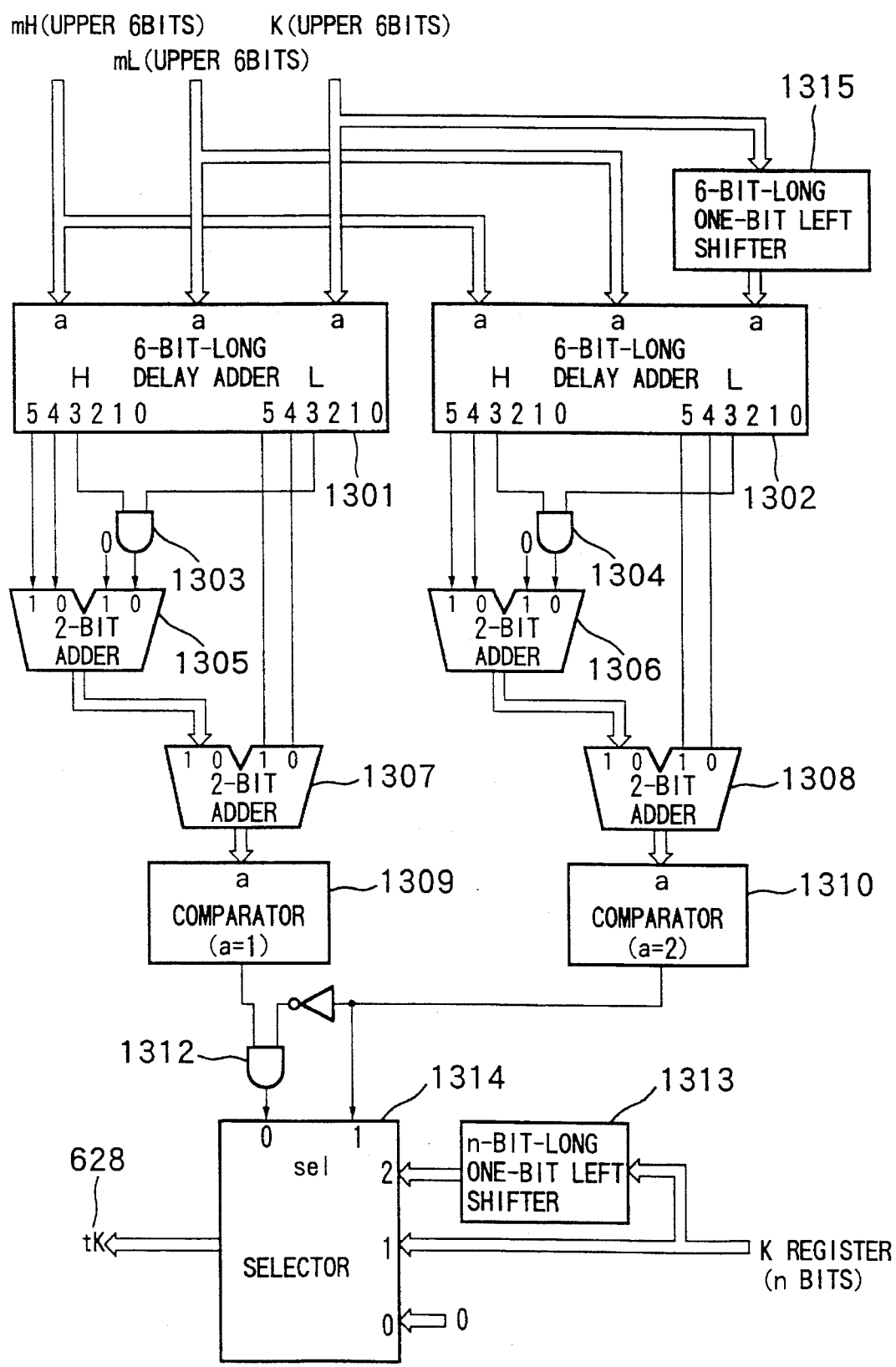
FIG. 14 is a block diagram of the (K×(a÷N)) operator as shown in FIG. 7.
Figure 16:
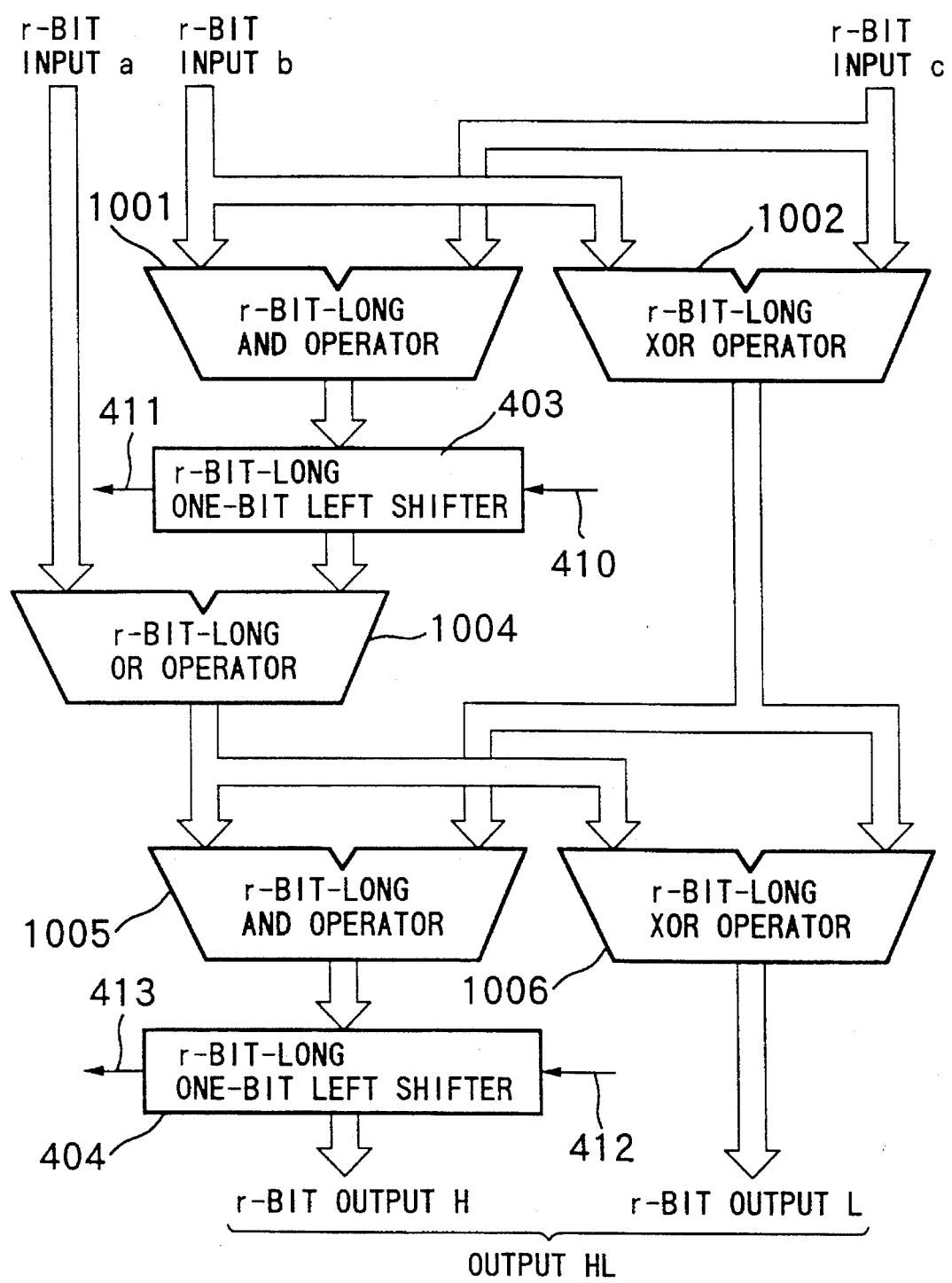
FIG. 16 is a block diagram to show the delay adder in the first adder as shown in FIG. 5.
Figure 17:
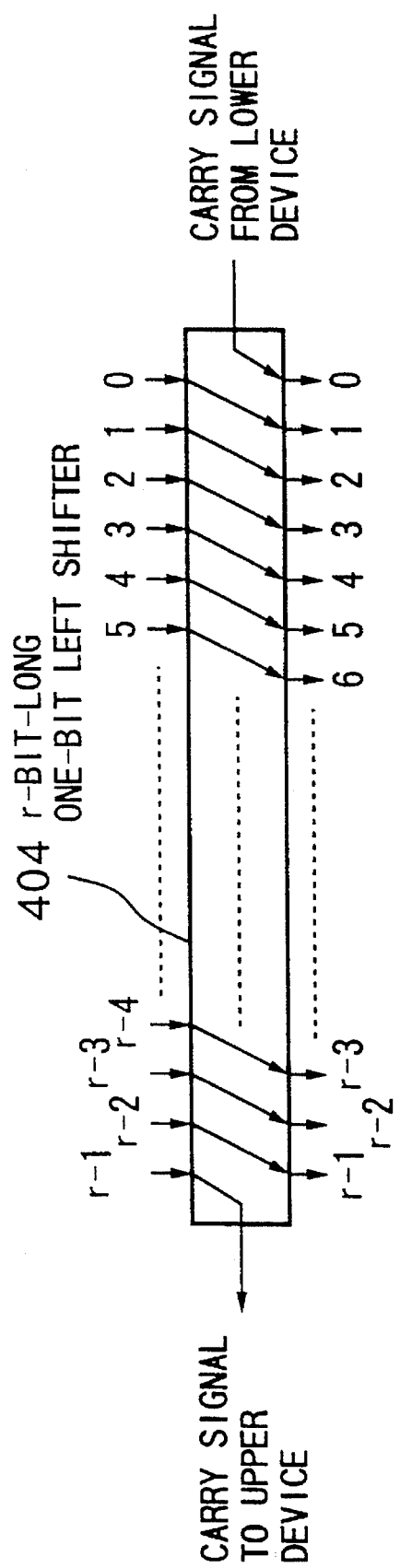
FIG. 17 is a block diagram to show the one-bit left shifter of the delay adder as shown in FIG. 16.

The (n+10)-bit-long delay adder A401 and the (n+10)-bit-long delay adder A402 have the same configuration as the r-bit-long delay adder A as shown in FIG. 16 when considering that r=n+10. The r-bit-long delay adder A in FIG. 16 has the same configuration as the r-bit-long delay adder in FIG. 11 except for the r-bit-long one-bit left shifter A 403 and the r-bit-long one-bit left shifter A404.

The r-bit-long one-bit left shifter A403 shifts the input from the r-bit-long AND operator 1001 to the left by one bit before its output. For the least significant bit of the output, it provides the carry signal 410 from the lower operator. It also outputs to outside the most significant bit of the input from the r-bit-long AND operator 1001 as the carry signal 411 for the higher operator.

The r-bit-long one-bit left shifter A404 shifts the data from the r-bit-long AND operator 1005 to the left by one bit before its output. For the least significant bit of the output, it outputs the carry signal 412 from the lower operator. Besides, it outputs to outside the most significant bit of the data from the r-bit-long AND operator 1005 as the carry signal 413. The one-bit left shifter 301, the r-bit-long one-bit left shifter A 403, and the r-bit-long one-bit left shifter A 404 are configured with wire connections only.

Figure 6:
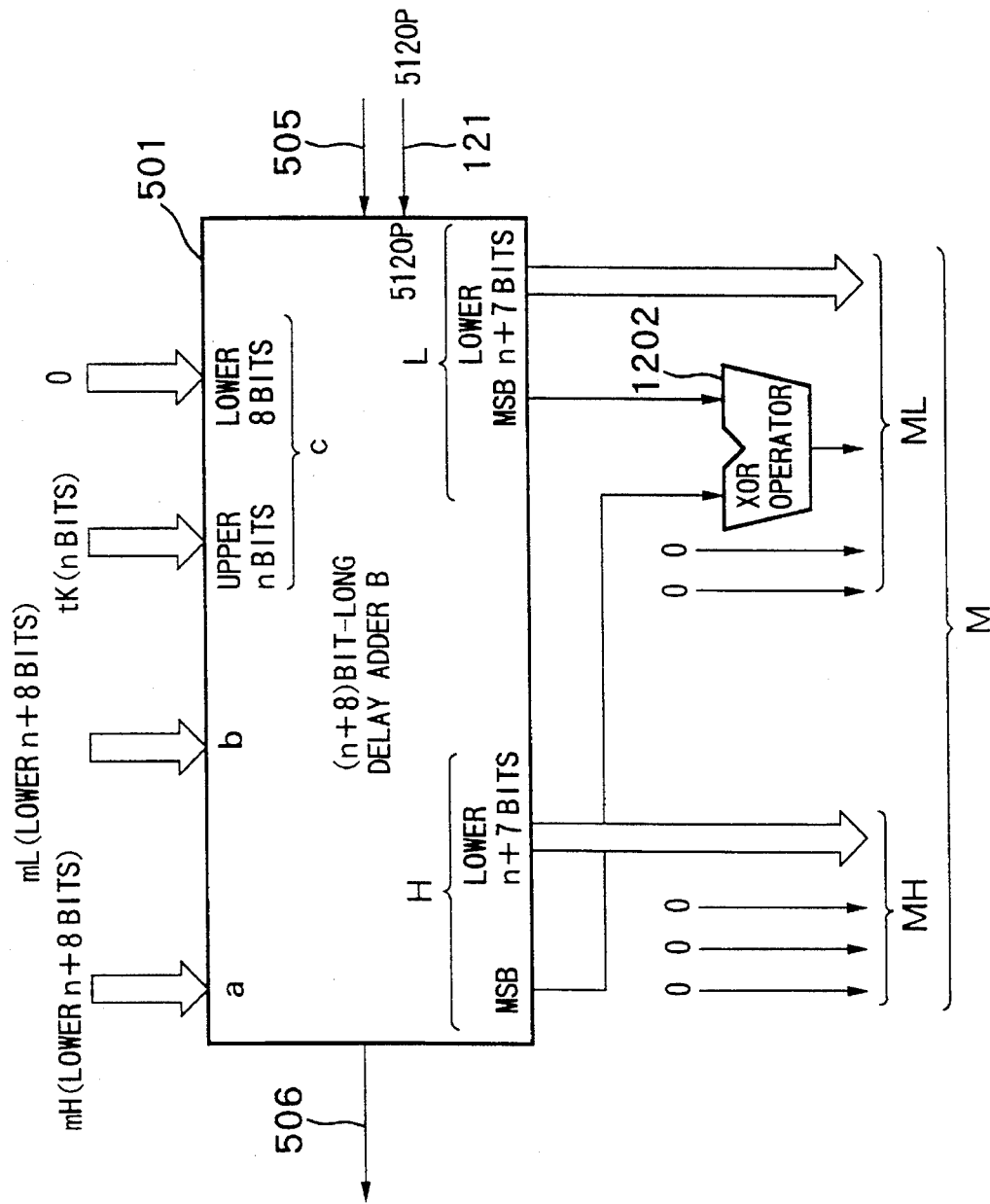
FIG. 6 is a block diagram to show a second adder in the exponentiation remainder operation device as shown in FIG. 3.
Figure 7:
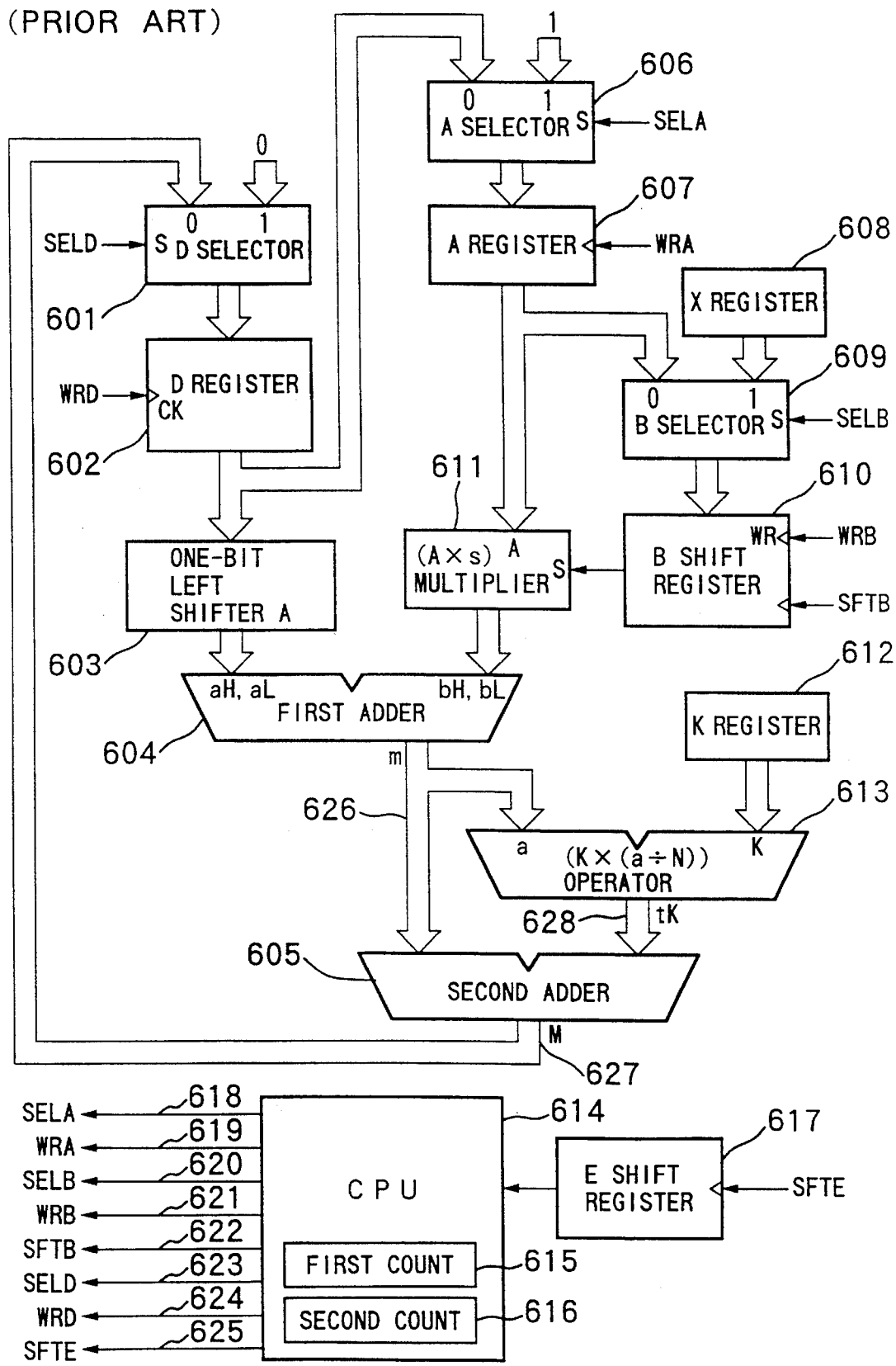
FIG. 7 is a block diagram to show an exponentiation remainder operation circuit according to the prior art.
Figure 8:
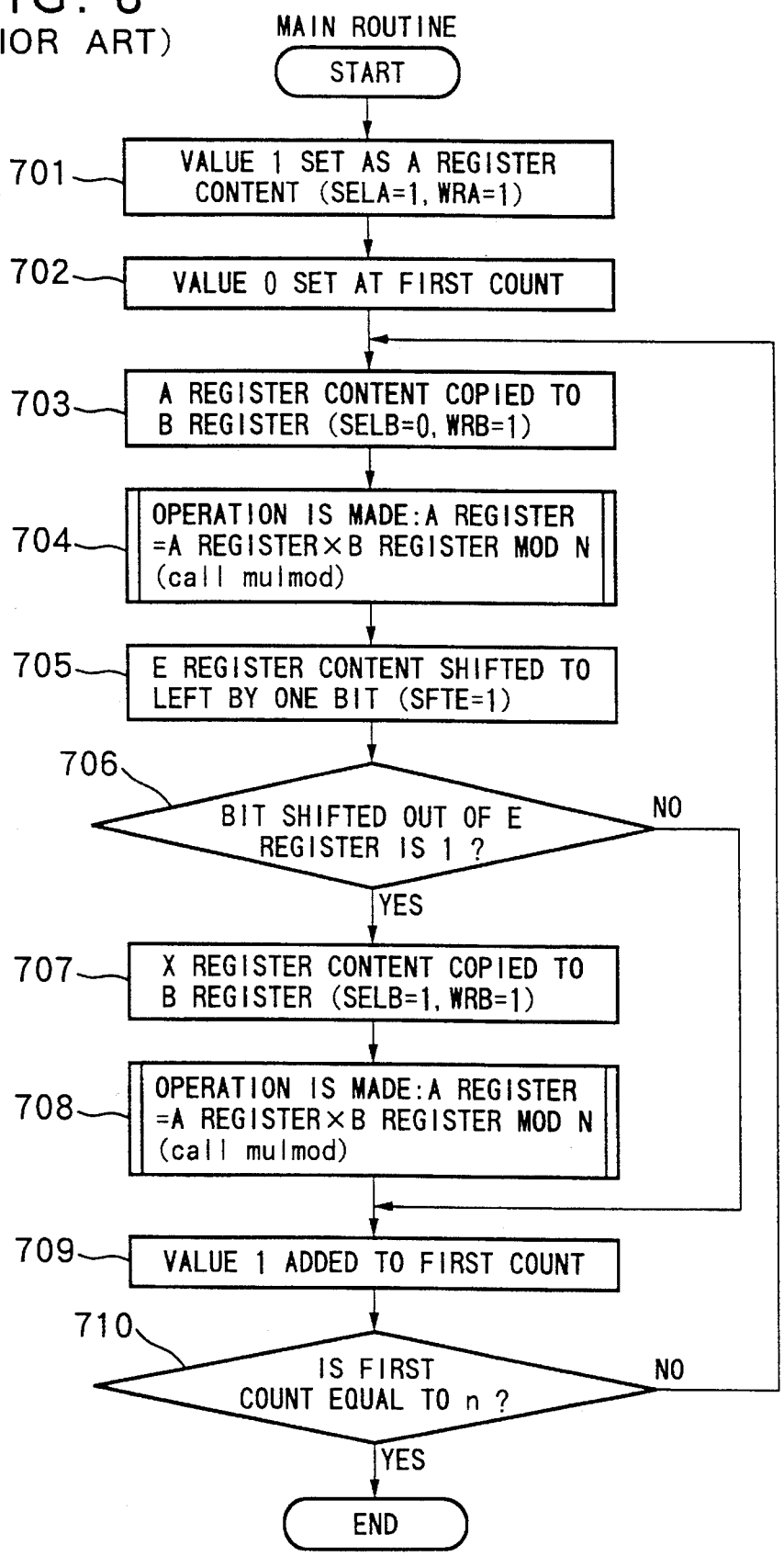
FIG. 8 is a flowchart to illustrate the operation of the exponentiation remainder operation circuit according to the prior art as shown in FIG. 7.
Figure 9:
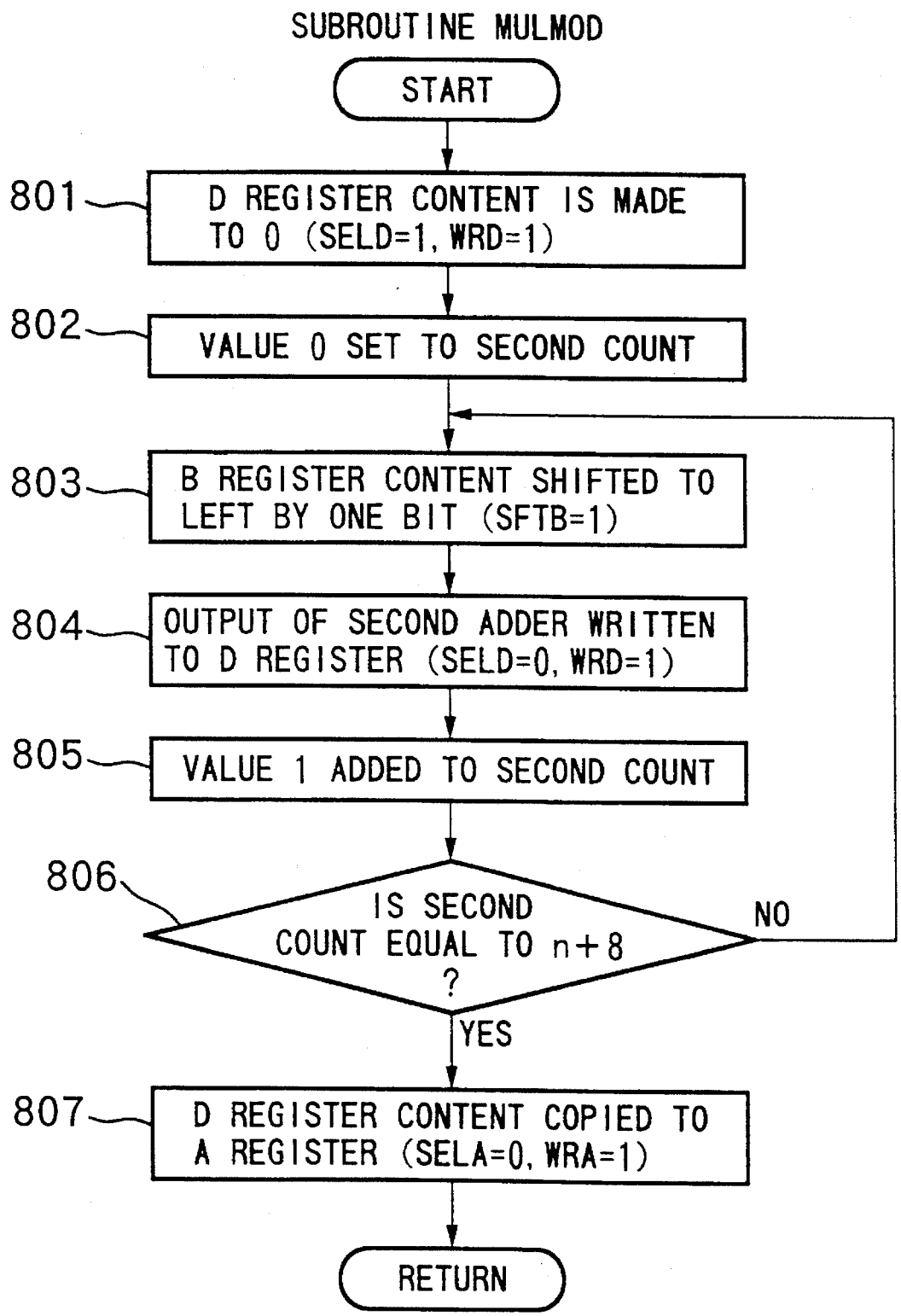
FIG. 9 is a flowchart for the subroutine MULMOD of FIG. 8.
Figure 10:
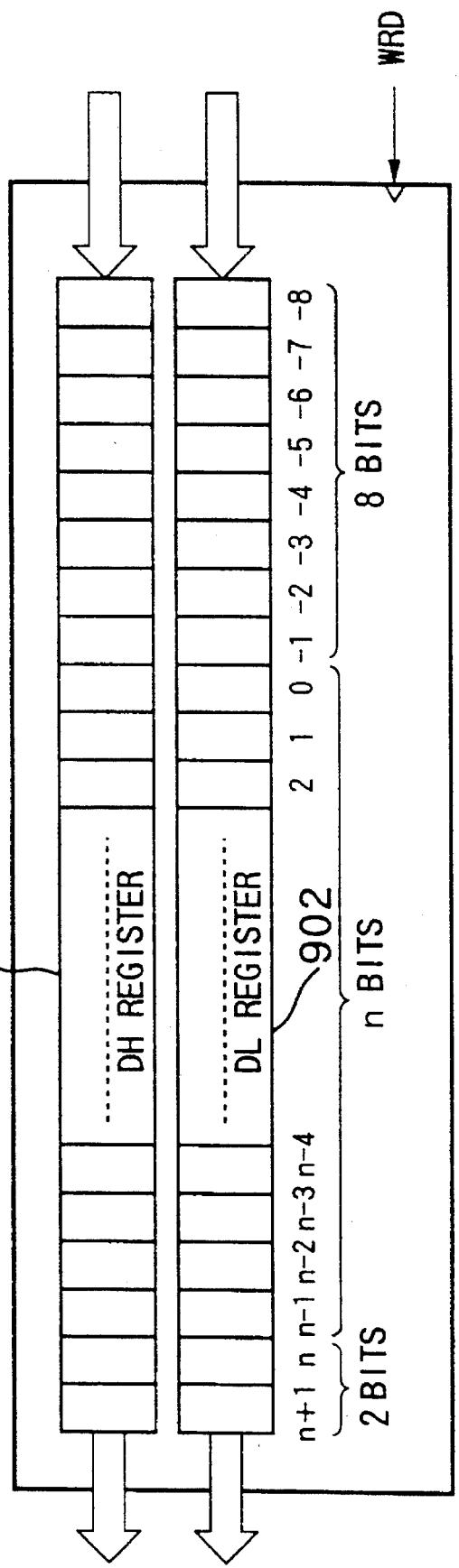
FIG. 10 is a diagram to show the configuration of a register D according to a conventional example of FIG. 7.

FIG. 6 is a block diagram of the second adder 303. The second adder 303 has the same configuration as the second adder 605 in the conventional example except for the (n+8)-bit-long delay adder B 501.

The (n+8)-bit-long delay adder B501 operates, when the 512OP signal 121 is 0, to sum up the inputs a, b and c, all of which have (n+8) bits in length, so as to generate output signals H and L and output the carry signal 506 for the higher operator. When the 512OP signal 121 is 1, it adds the inputs a, b and c, all of which have (n+8) bits in length, to the carry signal 505 from the lower operator so as to generate output signals H and L and outputs the carry signal 506 for the higher operator.

Figure 18:
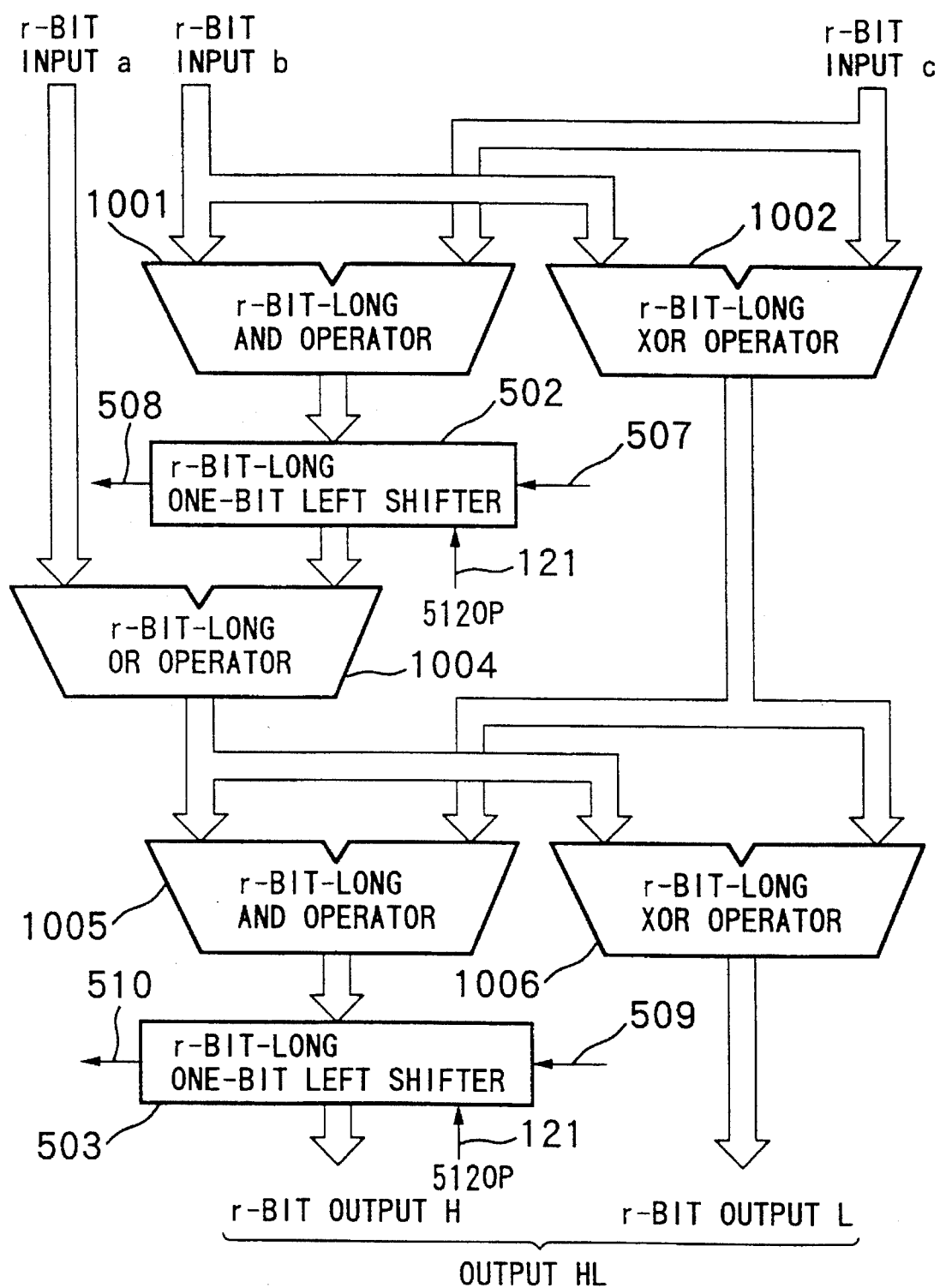
FIG. 18 is a block diagram to show the delay adder of the second adder as shown in FIG. 6.

The (n+8)-bit-long delay adder B 501 has the same configuration as the r-bit-long delay adder B as shown in FIG. 18 when r is n+8. The r-bit-long delay adder B of FIG. 18 has the same configuration as the r-bit-long delay adder of FIG. 11 except for the r-bit-long one-bit left shifter B502 and the r-bit-long one-bit left shifter B 503.

The r-bit-long one-bit left shifter B 502 shifts the input from the r-bit-long AND operator 1001 to the left by one bit with outputting the value 0 for the least significant bit. For bit 8 of the output, it provides bit 7 value of the input when the 512OP signal 121 is 0 and the carry signal 507 from the lower operator when the 512 OP signal 121 is 1. Besides, it outputs to outside the most significant bit of the input from the r-bit-long AND operator 1001 as the carry signal 508 for the higher operator.

The r-bit-long one-bit left shifter B 503 shifts the input from the r-bit-long AND operator 1005 to the left by one bit before output with providing 0 for the least significant bit. In addition, for bit 8 of the output, it provides bit 7 value of the input when the 512 OP signal 121 is 0 and the carry signal 509 from the lower operator when the 512 OP signal 121 is 1. The most significant bit of the input from the r-bit-long AND operator 1005 is output to outside as the carry signal 510 for the higher operator.

Figure 19:
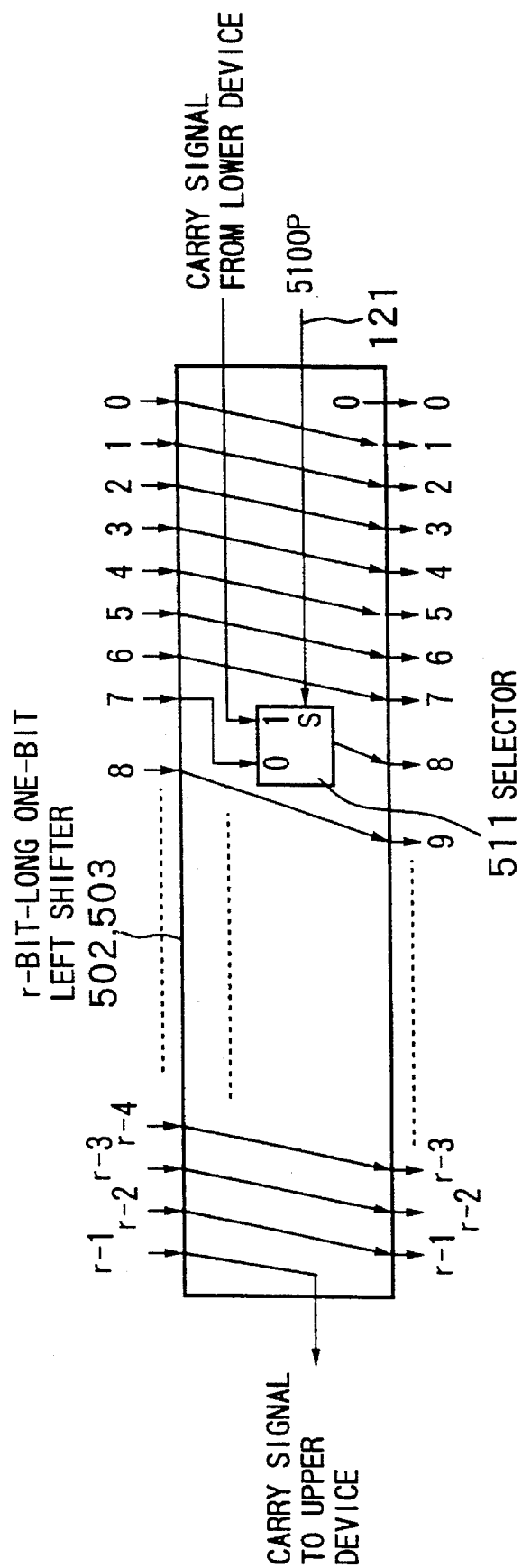
FIG. 19 is a block diagram to show the one-bit left shifter for the delay adder as shown in FIG. 18.
Figure 20:
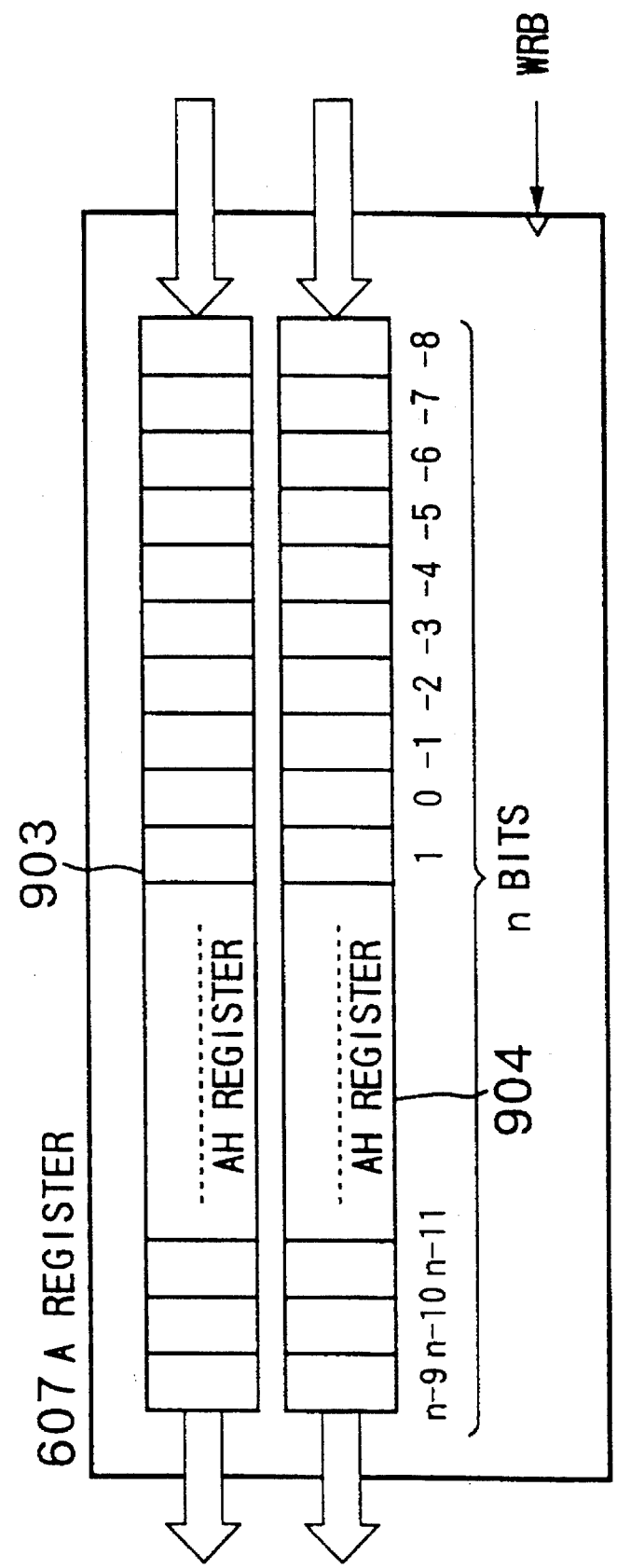
FIG. 20 is a diagram to show the configuration of a register A in the conventional example as shown in FIG. 7.
Figure 21:
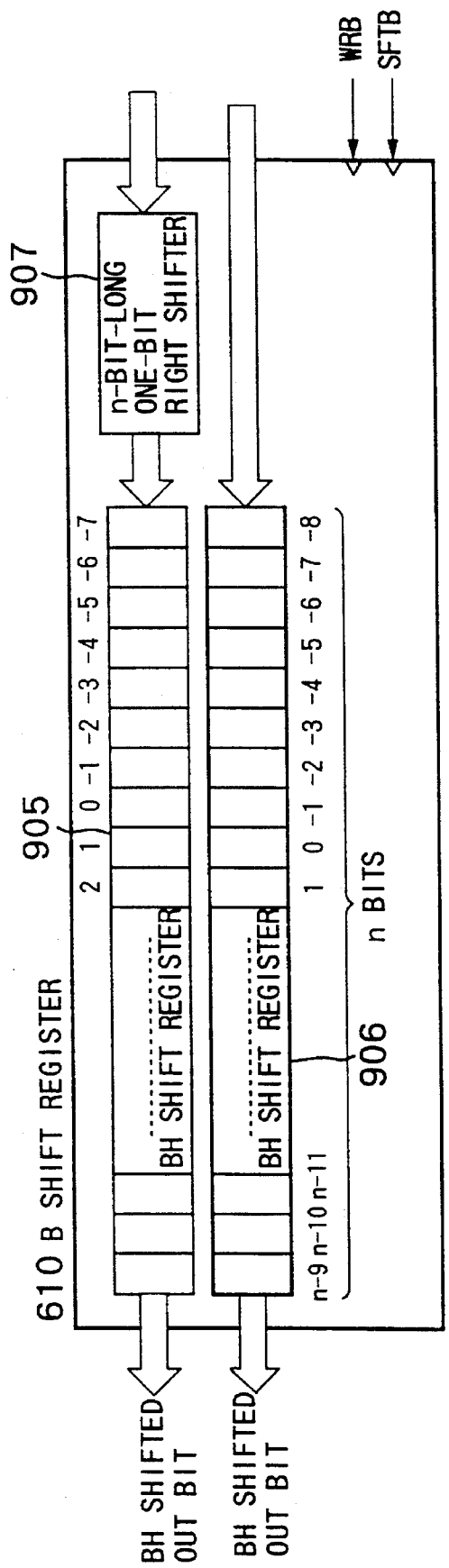
FIG. 21 is a diagram to show the configuration of a shift register B in the conventional example as shown in FIG. 7.
Figure 22:
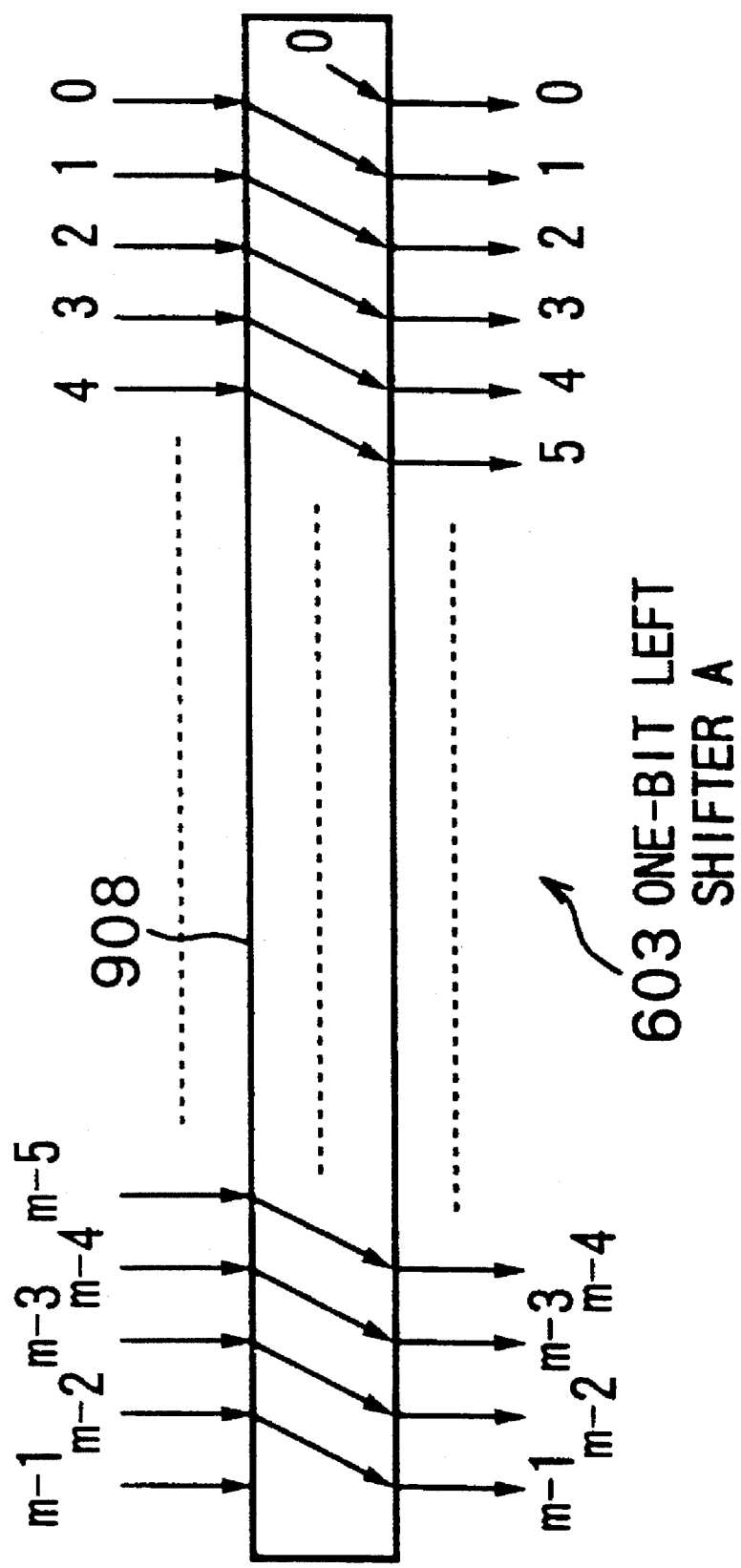
FIG. 22 is a diagram to show the configuration of the one-bit left shifter according to the conventional example.

The r-bit-long one-bit left shifter B502 and the r-bit-long one-bit left shifter B 502 are, as shown in FIG. 19, configured with wire connections and the selector 511. The selector 511 outputs bit 7 value of the input when the 512 OP signal 121 is 0 and the carry signal from the lower operator when the 512 OP signal 121 is 1, to bit 8 of the output.

With the configuration as described above, the exponentiation remainder operation circuit of the present invention can reduce the operation time to one fourth of that required in a conventional system when, with expressing the exponentiation remainder operation for n bits to be executed as "C←$C^E$ mod N", the parameter N can be expressed by the product P×Q of two prime numbers P and Q, both having n/2 bits in length, and one step is supposed to require one clock for execution, as shown in FIGS. 2, 15 (a), 15(b) and 15(c).

Specifically, the subroutines MULMOD and EXPMOD when the bit length is n/2=256 are described below. Referring to FIG. 15(a), the subroutine MOD has 3 clocks. FIG. 15(b) shows that the subroutine ADDMOD has 1+MOD=4 clocks. FIG. 15(c) indicates that the subroutine 512MOD has a length of MOD+MULMOD+ADDMOD+MOD+ADDMOD=3+(+(256+8)×4+1)+4+3+4=1073 clocks. Therefore, from FIG. 2, the number of clocks for the main routine is 512MOD+512MOD+EXPMOD+ADDMOD+1+MULMOD+ADDMOD+MULMOD+1=1073+1073+543746+4+1+1059+4+1059+1=548020 clocks.

Thus, the circuit of the present invention can reduce the operation time to 25.7% of the time for the conventional example (2134018 clocks). This is particularly effective for RSA code decoding. Further, its configuration with two exponentiation remainder operators for n/2 bits inside allows execution of two exponentiation remainder operations for n/2 bits at the same time.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the feature set out in the appended claims.

What is claimed is:

1. An exponentiation remainder operation circuit, comprising:

a first exponentiation remainder operator for performing exponentiation remainder operation for a n/2 bit length parameter, in which n is even number;

a second exponentiation remainder operator for performing an exponentiation remainder operation for a n/2 bit length parameter;

a first adder/subtractor for performing addition and subtraction for a n/2 bit length parameter;

a second adder/subtractor for performing addition and subtraction for a n/2 bit length parameter; and control means for performing an exponentiation remainder operation for a n-bit length parameter by controlling an exponentiation remainder operation of the first exponentiation remainder operator for upper n/2 bits of said n-bit length parameter, an exponentiation remainder operation of said second exponentiation remainder operator for lower n/2 bits of said n-bit length parameter, and an addition and subtraction of the results of operations of said first and second exponentiation remainder operators by said first and second adders/subtractors.

2. An exponentiation remainder operation circuit as set forth in claim 1, wherein said control means comprises:

first and second selection means for controlling selection whether a carry signal is used in the operation of said first exponentiation remainder operator and said first adder/subtractor;

a central processing unit (CPU) for outputting a control signal for controlling operations of said first and second exponentiation remainder operators and said first and second adders/subtractors; and a storage portion for storing the n-bit parameter as an object of operation, intermediate and final results of operations by said first and second exponentiation remainder operators and said first and second adder/subtractors.

3. An exponentiation remainder operation circuit as set forth in claim 2, wherein said first exponentiation remainder operator inputs an output signal of said first selection means as a carry input signal and a first control signal controlling whether the carry input signal is used for operation, and selects one of exponentiation remainder operation and multiplication remainder operation as an operation to be executed based on a second control signal;

said second exponentiation remainder operator inputs a carry input signal and a fixed value 0 as the first control signal for controlling whether the carry input signal is used for an operation, selects one of exponentiation remainder operation and multiplication remainder operation as an operation to be executed based on a second control signal, and outputs a carry output signal to said first selection means; and said control means controls said first and second exponentiation remainder operators to operate simultaneously in parallel.

4. An exponentiation remainder operation circuit as set forth in claim 2, wherein said first adder/subtractor inputs an output signal of said second selection means as a carry input signal and a third control signal for selecting one of addition and subtraction as an operation to be executed; and said second adder/subtractor inputs 0 as a carry input signal and said third control signal for selecting one of addition and subtraction as an operation to be executed, and outputs a carry output signal to said second selection means.

5. An exponentiation remainder operation circuit as set forth in claim 2, wherein said first selection means inputs the first control signal for performing switching control for switching the output signal between 0 and the carry output signal from said second exponentiation remainder operator; and said second selection means inputs the first control signal for performing switching control for switching the output signal between 0 and the carry output signal from said second adder/subtractor.

6. An exponentiation remainder operation circuit as set forth in claim 2, wherein said storage portion includes a n/2 bit length of first to tenth registers, and wherein:

said first register stores the upper n/2 bits of the n-bit parameter as an object for operation or the upper n/2 bits of the n-bit length parameter as the final result, said second register stores the lower n/2 bits of the n-bit length parameter as the object for operation or the lower n/2 bits of n-bit length parameter as the final result of operation;

said third to tenth registers store input values to be used in the operations of said first and second exponentiation remainder operators and first values to be used in the operations of said first and second exponentiation remainder operators and said first and second adders/subtractors, and intermediate results of operations of said first and second exponentiation remainder operators and said first and second adders/subtractors.

7. An exponentiation remainder operation circuit as set forth in claim 6, wherein said CPU unitedly operates said first and second registers as a n-bit length single register when final results of said first and second exponentiation remainder operators and said first and second adders/subtractors are stored.

8. An exponentiation remainder operation circuit as set forth in claim 1, wherein said control means performs an exponentiation remainder operation for deriving a remainder of division of a result obtained by exponentiation of a parameter C with a parameter E as an exponent, by a parameter N, wherein C, E, and N are n-bit length integers, through the means comprising:

means for deriving first and second remainder operation results as remainders of division of first and second prime numbers P and Q by the parameter C when the parameter N is expressed by a n/2 bit length of two prime numbers, by said first and second exponentiation remainder operators;

means for deriving a third remainder operation result expressed by a sum of two n/2 bit length values, which is the remainder in the division of the result of exponentiation of said first remainder operation result by a parameter EP as remainder of division of a parameter (P–1) by the parameter E, by the first prime number P, by said first exponentiation remainder operator;

means, in parallel to such process of said first exponentiation remainder operator, for deriving a fourth remainder operation result expressed by a sum of two n/2 bit length values, which is the remainder in the division of the result of exponentiation of said second remainder operation result by a parameter EQ as remainder of division of a parameter (Q–1) by the parameter E, by the second prime number Q, by said second exponentiation remainder operator;

means for deriving a fifth remainder operation result as a remainder of division of the sum of two n/2 bit length values which is the third remainder operation result, by the parameter P, and a sixth remainder operation result as a remainder of division of the sum of two n/2 bit length values which is the fourth remainder operation result, by the parameter Q, by the first and second exponentiation remainder operators;

means for deriving a subtraction result by subtracting said fifth remainder operation result from said sixth remainder operation result by said first adder/subtractor;

means for deriving a parameter V which is a n/2 bit length parameter and remainder of which is one when it is multiplied by said parameter P and then the product is divided by Q, and deriving a seventh remainder operation result expressed by a sum of two n/2 bit length values as remainders of division of a product of said parameter V and said subtraction result by the parameter Q, by said second exponentiation remainder operator;

means for deriving an eighth remainder operation result as a remainder of division of the sum of two n/2 bit length values as the seventh remainder operation result by the parameter Q, by said first and second exponentiation remainder operators;

means for deriving a product of multiplication of said second remainder operation result by the parameter P by said first and second exponentiation remainder operators; and means for deriving a final result of the exponentiation remainder operation as a sum of the parameter C and said fifth remainder operation result.

9. An exponentiation remainder operation circuit, comprising:

a first exponentiation remainder operator for performing an exponentiation remainder operation for a n/2 bit length parameter, in which n is an even number;

a second exponentiation remainder operator for performing exponentiation remainder operation for a n/2 bit length parameter;

a first adder/subtractor for performing addition and subtraction for a n/2 bit length parameter;

a second adder/subtractor for performing addition and subtraction for a n/2 bit length parameter; and control means for performing exponentiation remainder operation for a n-bit length parameter by controlling art exponentiation remainder operation of said first exponentiation remainder operator for art upper n/2 bits of said n-bit length parameter, art exponentiation remainder operation of said second exponentiation remainder operator for a lower n/2 bits of said n-bit length parameter, and addition and subtraction of the results of operations of said first and second exponentiation remainder operators by said first and second adders/subtractors;

said control means including:

first and second selection means for controlling selection whether a carry signal is used in the operation of said first exponentiation remainder operator and said first adder/subtractor;

a central processing unit (CPU) for outputting a control signal for controlling operations of said first and second exponentiation remainder operators and said first and second adders/subtractors; and a storage portion for storing the n-bit parameter as an object of operation, intermediate and final results of operations by said first and second exponentiation remainder operators and said first and second adders/subtractors, said first exponentiation remainder operator inputs an output signal of said first selection means as a carry input signal and a first control signal controlling whether the input carry signal is used for operation, and selects one of an exponentiation remainder operation and multiplication remainder operation as an operation to be executed based on a second control signal;

said second exponentiation remainder operator inputs a carry input signal and a fixed value 0 as the first control signal for controlling whether the input carry signal is used for operation, selects one of the exponentiation remainder operation and the multiplication remainder operation as the operation to be executed based on the second control signal, and outputs a carry output signal to said first selection means;

said first adder/subtractor inputs an output signal of said second selection means as a carry input signal and a third control signal for selecting one of addition and subtraction as the operation to be executed;

said second adder/subtractor inputs 0 as a carry input signal and said third control signal for selecting one of addition and subtraction as the operation to be executed, and outputs a carry output signal to said second selection means;

said first selection means inputs the first control signal for performing switching control for switching the output signal between 0 and the carry output signal from said second exponentiation remainder operator; and said second selection means inputs the first control signal for performing switching control for switching the output signal between 0 and the carry output signal from said second adder/subtractor.

10. An exponentiation remainder operation circuit as set forth in claim 9, wherein said storage portion includes a n/2 bit length of first to tenth registers, in which said first register stores the upper n/2 bits of the n-bit parameter as the object for operation or the upper n/2 bits of the n-bit length parameter as the final result, said second register stores the lower n/2 bits of the n-bit length parameter as the object for operation or the lower n/2 bits of n-bit length parameter as the final result of operation;

said third to tenth registers store input values to be used in the operations of said first and second exponentiation remainder operators and first values to be used in the operations of said first and second exponentiation remainder operators and said first and second adders/ subtractors, and intermediate results of operations of said first and second exponentiation remainder operators and said first and second adders/subtractors.

11. An exponentiation remainder operation circuit as set forth in claim 10, wherein said CPU unitedly operates said first and second registers as a n-bit length single register when final results of said first and second exponentiation remainder operators and said first and second adders/subtractors are stored.

12. A method of an exponentiation remainder operation comprising the steps of:

providing a first exponentiation remainder operator for performing an exponentiation remainder operation for a n/2 bit length parameter, in which n is an even number;

providing a second exponentiation remainder operator for performing an exponentiation remainder operation for a n/2 bit length parameter;

providing a first adder/subtractor for performing addition and subtraction for a n/2 bit length parameter;

providing a second adder/subtractor for performing addition and subtraction for a n/2 bit length parameter; and providing control means for performing an exponentiation remainder operation for a n-bit length parameter by controlling the exponentiation remainder operation of said first exponentiation remainder operator for an upper n/2 bits of said n-bit length parameter, the exponentiation remainder operation of said second exponentiation remainder operator for a lower n/2 bits of said n bit length parameter, and addition and subtraction of the results of operations of said first and second exponentiation remainder operators by said first and second adders/subtractors;

operating said control means for controlling said first and second exponentiation remainder operators, and said first and second adders/subtractors for performing an exponentiation remainder operation for deriving a remainder of division of a result obtained by exponentiation of a parameter C with a parameter E as an exponent, by a parameter N, wherein C, E, and N are n-bit length integers;

deriving first and second remainder operation results as remainders of division of first and second prime numbers P and Q by the parameter C when the parameter N is expressed by a n/2 bit length of two prime numbers, by said first and second exponentiation remainder operators;

deriving a third remainder operation result expressed by a sum of two n/2 bit length values, which is the remainder in the division of the result of exponentiation of said first remainder operation result by a parameter EP as a remainder of division of a parameter (P−1) by the parameter E, by the first prime number P, by said first exponentiation remainder operator;

deriving, in parallel to such process of said first exponentiation remainder operator, a fourth remainder operation result expressed by a sum of two n/2 bit length values, which is the remainder in the division of the result of exponentiation of said second remainder operation result by a parameter EQ as a remainder of division of a parameter (Q−1) by the parameter E, by the second prime number Q, by said second exponentiation remainder operator;

deriving a fifth remainder operation result as a remainder of division of the sum of two n/2 bit length values which is the third remainder operation result, by the parameter P, and a sixth remainder operation result as a remainder of division of the sum of two n/2 bit length values which is the fourth remainder operation result, by the parameter Q, by the first and second exponentiation remainder operators;

deriving a subtraction result by subtracting said fifth remainder operation result from said sixth remainder operation result by said first adder/subtractor;

deriving a parameter V which is a n/2 bit length parameter and a remainder of which is one when it is multiplied by said parameter P and then the product is divided by Q, and deriving a seventh remainder operation result expressed by a sum of two n/2 bit length values as remainders of a division of a product of said parameter V and said subtraction result by the parameter Q, by said second exponentiation remainder operator;

deriving an eighth remainder operation result as a remainder of division of the sum of two n/2 bit length values as the seventh remainder operation result by the parameter Q, by said first and second exponentiation remainder operators;

deriving a product of multiplication of said second remainder operation result by the parameter P by said first and second exponentiation remainder operators; and deriving a final result of the exponentiation remainder operation as a sum of the parameter C and said fifth remainder operation result.

13. In a system including a first exponentiation remainder operator for performing an exponentiation remainder operation for a n/2 bit length parameter, in which n is an even number, a second exponentiation remainder operator for performing an exponentiation remainder operation for n/2 bit length parameter, a first adder/subtractor for performing addition and subtraction for a n/2 bit length parameter, a second adder/subtractor for performing addition and subtraction for a n/2 bit length parameter and control means for controlling said first and second exponentiation remainder operators, and said first and second adders/subtractors, a process for an exponentiation remainder operation for deriving a remainder of division obtained by exponentiation of a parameter C with a parameter E as an exponent, by a parameter N, wherein C, E, and N are n-bit length integers, said process comprising the steps of:

deriving first and second remainder operation results as remainders of a division of first and second prime numbers P and Q by the parameter C when the parameter N is expressed by a n/2 bit length of two prime numbers, by said first and second exponentiation remainder operators;

deriving a third remainder operation result expressed by a sum of two n/2 bit length values, which is the remainder in the division of the result of exponentiation of said first remainder operation result by a parameter EP as a remainder of division of a parameter (P−1) by the parameter E, by the first prime number P, by said first exponentiation remainder operator;

deriving, in parallel to such process of said first exponentiation remainder operator, a fourth remainder operation result expressed by a sum of two n/2 bit length values, which is the remainder in the division of the result of exponentiation of said second remainder operation result by a parameter EQ as remainder of division of a parameter (Q−1) by the parameter E, by the second prime number Q, by said second exponentiation remainder operator;

deriving a fifth remainder operation result as a remainder of division of the sum of two n/2 bit length values which is the third remainder operation result, by the parameter P, and a sixth remainder operation result as a remainder of division of the sum of two n/2 bit length values which is the fourth remainder operation result, by the parameter Q, by the first and second exponentiation remainder operators;

deriving a subtraction result by subtracting said fifth remainder operation result from said sixth remainder operation result by said first adder/subtractor;

deriving a parameter V which is a n/2 bit length parameter and a remainder of which is one when it is multiplied by said parameter P and then the product is divided by Q, and deriving a seventh remainder operation result expressed by a sum of two n/2 bit length values as remainders of division of a product of said parameter V and said subtraction result by the parameter Q, by said second exponentiation remainder operator;

deriving an eighth remainder operation result as a remainder of division of the sum of two n/2 bit length values as the seventh remainder operation result by the parameter Q, by said first and second exponentiation remainder operators;

deriving a product of multiplication of said second remainder operation result by the parameter P by said first and second exponentiation remainder operators; and deriving a final result of the exponentiation remainder operation as a sum of the parameter C and said fifth remainder operation result.

* * * * *